US012561556B2

(12) United States Patent
Corral-Soto et al.

(10) Patent No.: US 12,561,556 B2
(45) Date of Patent: Feb. 24, 2026

(54) DEVICES, SYSTEMS, METHODS, AND MEDIA FOR DOMAIN ADAPTATION USING HYBRID LEARNING

(71) Applicants: Eduardo R Corral-Soto, Toronto (CA); Bingbing Liu, Markham (CA)

(72) Inventors: Eduardo R Corral-Soto, Toronto (CA); Bingbing Liu, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1139 days.

(21) Appl. No.: 17/475,003

(22) Filed: Sep. 14, 2021

(65) Prior Publication Data

US 2023/0082899 A1 Mar. 16, 2023

(51) Int. Cl.
*G06N 3/08* (2023.01)
*G06N 3/044* (2023.01)

(52) U.S. Cl.
CPC .............. *G06N 3/08* (2013.01); *G06N 3/044* (2023.01)

(58) Field of Classification Search
CPC ..................................................... G06N 3/044
See application file for complete search history.

(56) References Cited

U.S. PATENT DOCUMENTS

| | | |
|---|---|---|
| 2017/0147944 A1 | 5/2017 | Csurka et al. |
| 2020/0193269 A1 | 6/2020 | Park et al. |
| 2021/0201152 A1 | 7/2021 | Perez et al. |
| 2021/0216818 A1 | 7/2021 | Umeda et al. |

OTHER PUBLICATIONS

Han, X., Qi, L., Yu, Q., Zhou, Z., Zheng, Y., Shi, Y., & Gao, Y. (Jan. 18, 2021). Deep symmetric adaptation network for cross-modality medical image segmentation. arXiv.org. https://arxiv.org/abs/2101.06853 (Year: 2021).*
Jenni, S., & Favaro, P. (Jun. 13, 2018). Self-supervised feature learning by learning to spot artifacts. arXiv.org. https://arxiv.org/abs/1806.05024v1 (Year: 2018).*
Li, L., Gao, K., Cao, J., Huang, Z., Weng, Y., Mi, X., Yu, Z., Li, X., & xia, B. (Mar. 30, 2021). Progressive Domain Expansion Network for single domain generalization. arXiv.org. https://arxiv.org/abs/2103.16050 (Year: 2021).*
Gretton et al., A kernel method for the two-sample problem, JMLR 2008.
Hoffman et al, Cycada: Cycle-consistent adversarial domain adaptation. ICML Dec. 29, 2017.

(Continued)

*Primary Examiner* — Kamran Afshar
*Assistant Examiner* — Lokesha Patel

(57) ABSTRACT

Devices, systems, methods, and media are disclosed for domain adaptation of a trained machine learning model using hybrid learning. A hybrid approach to domain adaptation is disclosed that combines aspects of discrepancy-based, adversarial, and reconstruction-based approaches to achieve an end-to-end trained model for performing a prediction task (such as semantic segmentation) on a sparsely labeled dataset in a target domain, by leveraging a richly-labeled dataset in the source domain. Some embodiments may also provide a trained domain translation model for generating synthetic data samples in a first domain based on input data samples from a second domain.

18 Claims, 12 Drawing Sheets

(56) References Cited

OTHER PUBLICATIONS

Zhu et al., Unpaired Image-to-Image Translation using Cycle-Consitent Adversarial Networks 2017.

Baochen and Saenko. Deep coral: Correlation alignment for deep domain adaptation. ECCV 2016.

Wang, Mei, and Weihong Deng. "Deep visual domain adaptation: A survey." Neurocomputing 2018.

Corral-Soto et al. LiDAR few-shot domain adaptation via integrated CycleGAN and 3D object detector with joint learning delay, ICRA 2021.

Triess et al., "A Survey on Deep Domain Adaptation for LiDAR Perception". IV Workshops. Jun. 7, 2021.

Cortinhal et al., "SalsaNext: Fast, Uncertainty-aware Semantic Segmentation of LiDAR Point Clouds for Autonomous Driving". Jul. 9, 2020.

Sun, Yu, et al. "Test-time training with self-supervision for generalization under distribution shifts." ICML 2020.

Jiang et al., Tsit: A simple and versatile framework for image-to-image translation. ECCV 2020.

Anonymous Author(s). "Unsupervised Domain Adaptation in LiDAR Semantic Segmentation with Self-Supervision and Gated Adapters". 35th Conference on Neural Information Processing Systems (NeurIPS 2021). 2021.

* cited by examiner

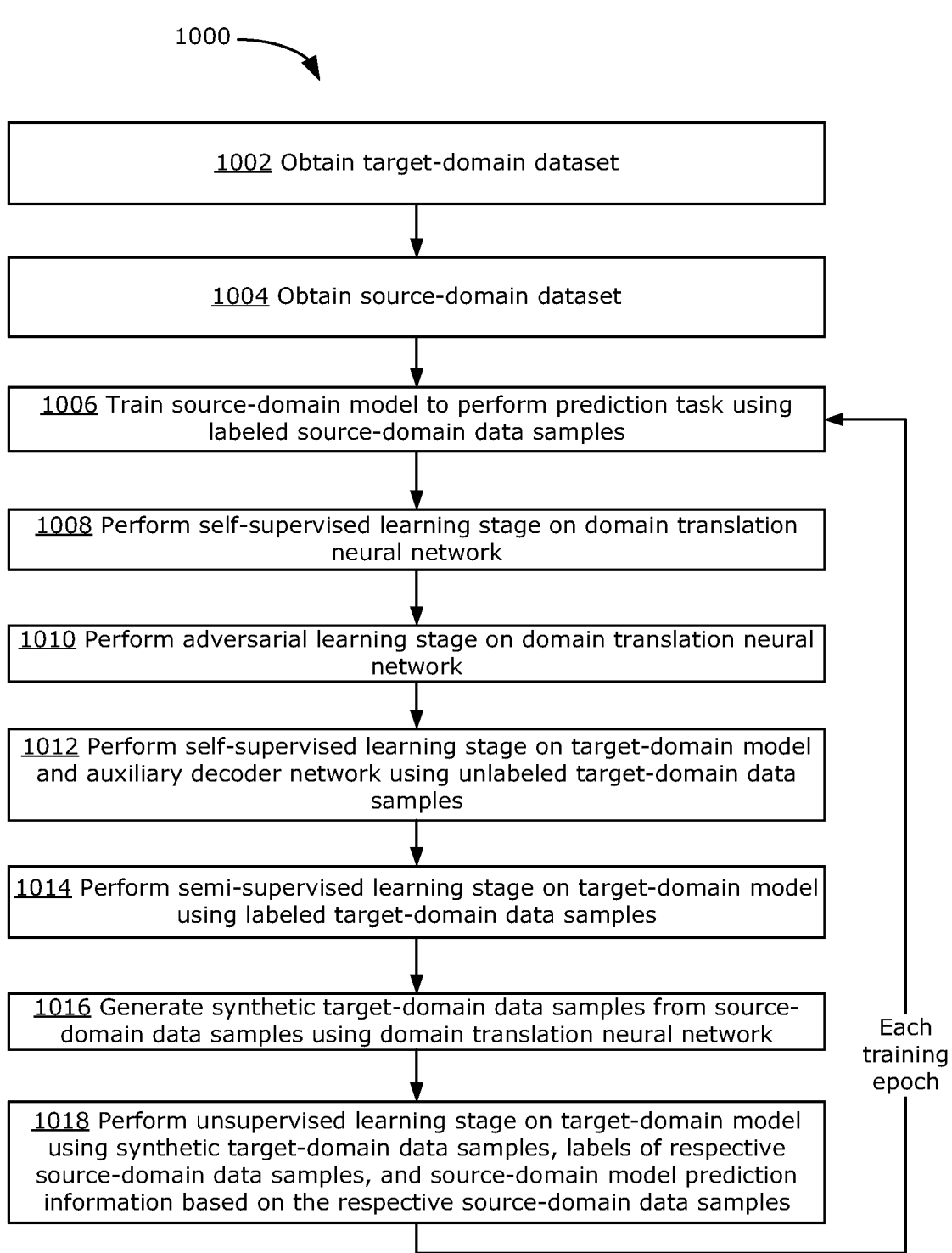

1000

1002 Obtain target-domain dataset

1004 Obtain source-domain dataset

1006 Train source-domain model to perform prediction task using labeled source-domain data samples

1008 Perform self-supervised learning stage on domain translation neural network

1010 Perform adversarial learning stage on domain translation neural network

1012 Perform self-supervised learning stage on target-domain model and auxiliary decoder network using unlabeled target-domain data samples

1014 Perform semi-supervised learning stage on target-domain model using labeled target-domain data samples

1016 Generate synthetic target-domain data samples from source-domain data samples using domain translation neural network

1018 Perform unsupervised learning stage on target-domain model using synthetic target-domain data samples, labels of respective source-domain data samples, and source-domain model prediction information based on the respective source-domain data samples Each training epoch

FIG. 10

DEVICES, SYSTEMS, METHODS, AND MEDIA FOR DOMAIN ADAPTATION USING HYBRID LEARNING

RELATED APPLICATION DATA

This is the first patent application related to this matter.

FIELD

The present application generally relates to domain adaptation, and in particular to devices, systems, methods, and media for domain adaptation of a trained machine learning model using end-to-end hybrid machine learning.

BACKGROUND

Semantic Segmentation and Instance Segmentation

Computer vision is an integral part of various intelligent/ autonomous systems in various fields, such as autonomous driving, autonomous manufacturing, inspection, and medical diagnosis. Computer vision is a field of artificial intelligence in which computers learn to interpret and understand the visual world using digital images. Using digital images generated by cameras, a computer can use a deep learning model to accurately "perceive" an environment (i.e. identify and classify objects) in the environment and react to what is "perceived" in the environment. For example, an autonomous vehicle has cameras mounted on the vehicle that capture images of the environment surrounding the vehicle during operation of the vehicle. A computer of the vehicle processes the digital images captured by the cameras.

Sematic segmentation is a machine learning (ML) technique that labels each pixel of a digital image with a corresponding class of what is being represented. Every pixel, belonging to the same class of object, is labelled as that object. For example, all people detected in an image that can be segmented as one object and all background (i.e., not people) as another object. Semantic segmentation can also be applied in the context of point clouds generated by, for example, Light Detection and Ranging (LiDAR) sensors. Each data point in a point cloud can be labelled with a corresponding class of what is being represented.

In addition to semantic segmentation, a related machine learning technique used in computer vision is instance segmentation. Whereas semantic segmentation methods label pixels of a digital image with corresponding semantic labels indicative of what categories are being detected in the digital image, such that all cars detected in the digital image are labelled with the same semantic label ("e.g. "car"), the sky is labelled with another semantic label (e.g. "sky"), etc., instance segmentation methods identify each instance of objects represented by the categories in the digital image, then label the pixels of each instance of objects with an instance label (e.g. every car, bicycle, or building in the scene has a respective instance label). Therefore, whereas semantic segmentation methods label each pixel of a digital image with a semantic label representing its category, instance segmentation methods further label the pixels of the instance of objects represented by every category with an instance label.

LiDAR and Point Clouds

In addition to cameras, or as an alternative to cameras, autonomous vehicles may use one or more LiDAR sensors to perceive their environments. A LiDAR (also referred to a "Lidar" or "LIDAR" herein) sensor generates point cloud data representing a three-dimensional (3D) environment (also called a "scene") scanned by the LIDAR sensor. A single scanning pass of the LIDAR sensor generates a "frame" of point cloud data (referred to hereinafter as a "point cloud frame" or simply a "frame"), consisting of a set of points from which light is reflected from one or more points in space, within a time period representing the time it takes the LIDAR sensor to perform one scanning pass. Some LIDAR sensors, such as spinning scanning LIDAR sensors, includes a laser array that emits light in an arc and the LIDAR sensor rotates around a single location to generate a point cloud frame; others LIDAR sensors, such as solid-state LIDAR sensors, include a laser array that emits light from one or more locations and integrate reflected light detected from each location together to form a point cloud frame. Each laser in the laser array is used to generate multiple points per scanning pass, and each point in a point cloud frame corresponds to an object reflecting light emitted by a laser at a point in space in the environment. Each point is typically stored as a set of spatial coordinates (X, Y, Z) as well as other data indicating values such as intensity (i.e. the degree of reflectivity of the object reflecting the laser). The other data may be represented as an array of values in some implementations. In a scanning spinning LIDAR sensor, the Z axis of the point cloud frame is typically defined by the axis of rotation of the LIDAR sensor, roughly orthogonal to an azimuth direction of each laser in most cases (although some LIDAR sensor may angle some of the lasers slightly up or down relative to the plane orthogonal to the axis of rotation).

Point cloud frames may also be generated by other scanning technologies, such as high-definition radar or depth cameras, and theoretically any technology using scanning beams of energy, such as electromagnetic or sonic energy, could be used to generate point cloud frames. Whereas examples will be described herein with reference to LIDAR sensors, it will be appreciated that other sensor technologies which generate point cloud frames could be used in some embodiments. Point cloud frames can be processed using techniques similar to those described above in the context of digital images: for example, points in a point cloud frames can be classified using semantic segmentation and/or instance segmentation, and objects can be identified in a point cloud frame using object detection.

Machine Learning Using Point Clouds

Because of the sparse and unordered nature of point cloud frames, the cost of collecting and labeling point cloud frames at the point level (i.e. labelling the points in point cloud frames) is time consuming and expensive, typically involving human-generated labels added to subsets of points within the point cloud frame. Points in a point cloud frame must be clustered, segmented, or grouped (e.g., using object detection, semantic segmentation, instance segmentation, or panoptic segmentation) such that a collection of points in the point cloud frame may be labeled with an object class (e.g., "pedestrian" or "motorcycle") or an instance of an object class (e.g. "pedestrian #3") by a human, with these labels being used in machine learning to train models for prediction tasks on point cloud frames, such as object detection or various types of segmentation. Only after the model has been trained can the trained model be used to automatically label points within previously-unlabeled point cloud frames. This cumbersome process of labeling has resulted in limited availability of labeled point cloud frames representing various road and traffic scenes, which are needed to train high accuracy models for prediction tasks on point cloud frames using machine learning.

Examples of such labeled point cloud datasets that include point cloud frames that are used to train models using machine learning for prediction tasks, such as segmentation and objection detection, are the SemanticKITTI dataset (described by J. Behley et al., "SemanticKITTI: A Dataset for Semantic Scene Understanding of LiDAR Sequences," 2019 IEEE/CVF International Conference on Computer Vision (ICCV), Seoul, Korea (South), 2019, pp. 9296-9306, doi: 10.1109/ICCV.2019.00939), KITTI360 (described by J. Xie, M. Kiefel, M. Sun and A. Geiger, "Semantic Instance Annotation of Street Scenes by 3D to 2D Label Transfer," 2016 IEEE Conference on Computer Vision and Pattern Recognition (CVPR), Las Vegas, NV, USA, 2016, pp. 3688-3697, doi: 10.1109/CVPR.2016.401.), and Nuscenes-lidarseg (described by H. Caesar et al., "nuScenes: A Multimodal Dataset for Autonomous Driving," 2020 IEEE/CVF Conference on Computer Vision and Pattern Recognition (CVPR), Seattle, WA, USA, 2020, pp. 11618-11628, doi: 10.1109/CVPR42600.2020.01164.). SemantiKITTI and nuScenes may be the only available point cloud datasets with semantic information, i.e. point cloud frames labeled with semantic information for training models for prediction tasks on point cloud frames, such as segmentation or object detection.

Machine learning models having an encoder-decoder architecture where the encoder is a Convolutional Neural Networks (CNNs) or Fully Convolutional Neural Networks (F-CNNs) and the decoder is a transpose CNN or a transpose F-CNN have been used or proposed for image and point cloud segmentation. In the context of autonomous driving, such models have been implemented in order to classify pixels of an image or points of a point cloud to generate labels such as vehicles, pedestrians, cyclists, roads, and other categories and/or instances of such categories. For example, SalsaNet as described in Aksoy et al., "*SalsaNet: Fast Road and Vehicle Segmentation in LiDAR Point Clouds for Autonomous Driving,*" arXiv preprint arXiv:1909.08291, 2019, attempts vehicle-road segmentation based on a Birds-Eye-View (BEV) image constructed from a point cloud, using a standard U-Net encoder/decoder network.

Domain Adaptation

Given the difficulties described above regarding the need to label point clouds for use in training models using machine learning, a need exists for facilitating the segmentation of new, unlabeled point cloud datasets using techniques such as semantic segmentation or instance segmentation in order to cluster and label points within unlabeled point cloud frames. One approach to facilitating the segmentation of unlabeled point cloud datasets is domain adaptation.

The problem addressed by domain adaptation may be formulated as follows: given two unpaired datasets from two domains, X and Y, and given sufficient information (such as semantic labels) to perform a prediction task (such as semantic segmentation or instance segmentation) on the dataset from domain X, domain adaptation seeks to train a neural network or other model, using machine learning, to perform the prediction task on the dataset from domain Y. In the context of point clouds, the two unpaired datasets may include data samples (i.e. point cloud frames) captured using two different LiDAR sensors with different specifications (e.g., different resolutions) in two different locations (e.g., two different countries), where the objects of interest in the data samples (i.e. point clouds) of the two unpaired datasets may vary in type, shape, or size. The datasets may differ based on intrinsic parameters of the LiDAR sensor (e.g., number of channels, resolution, and field of view), extrinsic parameters of the LiDAR sensor (e.g., location of the sensor, position of the sensor), differences in scenes or objects (e.g. differences in types or shapes of objects encountered in different countries), and the size of the labeled dataset. In this description of domain adaptation, domain X may be referred to as the "source domain", and domain Y may be referred to as the "target domain".

Domain adaptation is not a new research area. There are several published methods in the literature that can be classified into "Discrepancy-based", "Adversarial-based", and "Reconstruction-based" approaches to domain adaptation, as described by Wang, Mei, and Weihong Deng. "Deep visual domain adaptation: A survey." Neurocomputing 2018. In general terms, discrepancy-based approaches seek to fine-tune the weight values of a deep neural network with labeled or unlabeled data to diminish the domain shift, adversarial-based approaches use domain discriminators to encourage domain confusion through an adversarial objective, and reconstruction-based approaches use data reconstruction as an auxiliary task to ensure feature invariance.

Discrepancy-based approaches to domain adaptation focus on reducing statistical differences between two datasets by minimizing differences of statistical moments. Examples of discrepancy-based approaches include CORAL, described by Baochen and Saenko, "Deep coral: Correlation alignment for deep domain adaptation", ECCV 2016, and MMD, described by Gretton et al., "A kernel method for the two-sample problem", JMLR 008.

Adversarial approaches use image-to-image translation engines to convert inputs from one domain into the other domain. For example, Cycada, described by Hoffman et al, "Cycada: Cycle-consistent adversarial domain adaptation", ICML 2018, makes use of the CycleGAN method to perform image-to-image translation of RGB images in the pixel space, and uses the ADDA method to perform domain adaptation in the feature space. Cycada introduces the concept of a semantic consistency loss in the feature space, which is used to train the model. However, Cycada is not an end-to-end network. Instead, four pieces of code need to be run sequentially (and store intermediate data) before getting the final result at the end of the process.

Another adversarial approach to domain adaptation is TSIT, described by Jiang et al., "Tsit: A simple and versatile framework for image-to-image translation". ECCV, 2020. TSIT is a domain adaptation approach for camera images, which uses two encoders and one decoder trained using adversarial training. TSIT combines features from the two encoders at different resolution levels. TSIT works for semantic segmentation, but does not work with LiDAR data.

A further adversarial approach to domain adaptation for imaging data is LCP, described by Corral-Soto et al., "LiDAR few-shot domain adaptation via integrated CycleGAN and 3D object detector with joint learning delay", ICRA 2021. LCP works with point clouds, focusing on domain adaptation for 3D object detection, but it does not work for other predictions tasks, such as semantic segmentation.

There thus exists a need for a domain adaptation technique that overcomes one or more of the limitations of existing approaches described above.

SUMMARY

The present disclosure describes devices, systems, methods, and media for domain adaptation using hybrid learning. Example embodiments described herein may use a hybrid approach to domain adaptation that combines aspects of discrepancy-based, adversarial, and reconstruction-based approaches to achieve an end-to-end trained model for performing a prediction task (such as semantic segmentation) on a sparsely labeled dataset in a target domain, by leveraging a richly-labeled dataset in the source domain.

Training a model to perform the prediction task using labeled data samples from the source-domain dataset (e.g., SemanticKITTI) won't generalize well when evaluated using data samples (i.e. point clouds) from the target-domain dataset (e.g., nuScenes, in this example an unlabeled or largely unlabeled dataset) due to domain shift. Labeling the whole target-domain dataset is slow and expensive. However, labeling a few hundred (e.g. 1000) data samples (i.e. point cloud frames) of the target-domain dataset is feasible. Therefore, examples described herein may train a target-domain model using a fully-labeled source-domain dataset and a sparsely-labeled target-domain dataset to provide a trained target-domain model whose performance on the prediction task (e.g., semantic segmentation) is suitable for inference using data samples from the target domain.

Examples described herein may be end-to-end, which means that a single training algorithm may be executed without further intervention required before securing the final result (i.e. a trained target-domain model that performs the prediction task for unlabeled data samples from a dataset of the target domain).

Examples described herein may combine several learning paradigms: supervised training of a source-domain model to perform the prediction task (e.g., semantic segmentation), self-supervised training of a target-domain model (encoder only) using the full target-domain dataset (without labels), semi-supervised training of the target-domain model (encoder and decoder) using the relatively small subset of labeled data samples in the target-domain dataset, and unsupervised training of the target-domain model (encoder and decoder) using labeled source-domain samples translated into synthetic target-domain data samples in combination with the associated source-domain labels.

As used herein, the term "imaging data" refers to data, such as point cloud frames or camera images, which represent a scene seen from the point of view of an imaging sensor, such as a LiDAR sensor or a camera.

As used herein, the term "prediction task" refers to a task performed by a model, whereby one or more data samples provided as input to the model result in prediction information being generated by the model, the prediction information predicting one or more conclusions based on the data sample(s) used as input. In the context of machine learning, the model may be trained to perform the prediction task. Prediction tasks include classification tasks, in which the prediction data may include a predicted class, or a probability distribution over one or more classes, for each data sample, or for portions of each data sample, received as input.

As used herein, the term "model" refers to a probabilistic, mathematical, or computational model used to process input data to generate prediction information regarding the input data. In the context of machine learning, a "model" refers to a model trained using machine learning techniques; the term "network" may refer to a model trained using machine learning that is configured as an artificial neural network or other network structure. The term "subnetwork" refers to a portion of network or other model.

As used herein, the term "data sample" refers to a single instance of data in a particular format. A single data sample may be provided to a model as input data; in some embodiments, a batch including multiple data samples may be provided as input to the model. In some examples, a model may a generate data sample as output data. Examples of a single data sample include a camera image (in various formats) or a point cloud (in various formats).

As used herein, the term "label information" refers to semantic information associated with a data sample, such as one or more labels associated with the data sample or portions thereof. An example of label information in the context of imaging data is a label map associating a class membership for each pixel or point in an imaging data sample.

As used herein, the term "domain" refers to a context in which a dataset is generated. In the context of point clouds, such as point clouds generated by LiDAR sensors, the domains of two point cloud frames may differ due to factors such as intrinsic parameters of the LiDAR sensor which generated the two point cloud frames (e.g., number of channels, resolution, and field of view), extrinsic parameters of the LiDAR sensor which generated the two point cloud frames (e.g., location of the sensor, position of the sensor), differences in scenes or objects (e.g. differences in types or shapes of objects encountered in different countries), and the sizes of the datasets.

In some aspects, the present disclosure describes a method for training a target-domain model. The method comprises a number of steps. A target-domain dataset is obtained, comprising a plurality of target-domain data samples. A source-domain dataset is obtained, comprising a plurality of source-domain data samples. Each source-domain data sample is associated with respective label information. Self-supervised learning is performed to train a domain translation neural network, comprising a target-domain encoder subnetwork, a target-domain decoder subnetwork, a source-domain encoder subnetwork, and a source-domain decoder subnetwork, by training the target-domain encoder subnetwork to encode target-domain data, and training the target-domain decoder subnetwork to reconstruct target-domain data samples from encoded target-domain data, using one or more target-domain data samples of the target-domain dataset; and also by training the source-domain encoder subnetwork to encode source-domain data, and training the source-domain decoder subnetwork to reconstruct source-domain data samples from encoded source-domain data, using one or more source-domain data samples of the source-domain dataset. Adversarial learning is performed to train the domain translation neural network by training the target-domain encoder subnetwork to encode target-domain data, and training the source-domain decoder subnetwork to synthesize source-domain data samples from encoded target-domain data, using one or more target-domain data samples of the target-domain dataset; and also by training the source-domain encoder subnetwork to encode source-domain data, and training the target-domain decoder subnetwork to synthesize target-domain data samples from encoded source-domain data, using one or more source-domain data samples of the source-domain dataset. One or more source-domain data samples of the plurality of source-domain data samples are processed, using the source-domain encoder subnetwork and the target-domain decoder subnetwork, to generate a respective one or more synthetic target domain data samples. The target-domain model is trained to perform a prediction task on target domain data using the one or more synthetic target-domain data samples, and the respective label information of the one or more source-domain target samples.

In some aspects, the present disclosure describes a system for training a target-domain model. The system comprises a processor device and a memory. The memory stores a target-domain dataset comprising a plurality of target-domain data samples; a source-domain dataset comprising a plurality of source-domain data samples, each source-domain data sample being associated with respective label information; and machine-executable instructions which, when executed by the processor device, cause the system to perform a number of steps. Self-supervised learning is performed to train a domain translation neural network, comprising a target-domain encoder subnetwork, a target-domain decoder subnetwork, a source-domain encoder subnetwork, and a source-domain decoder subnetwork, by training the target-domain encoder subnetwork to encode target-domain data, and training the target-domain decoder subnetwork to reconstruct target-domain data samples from encoded target-domain data, using one or more target-domain data samples of the target-domain dataset; and also by training the source-domain encoder subnetwork to encode source-domain data, and training the source-domain decoder subnetwork to reconstruct source-domain data samples from encoded source-domain data, using one or more source-domain data samples of the source-domain dataset. Adversarial learning is performed to train the domain translation neural network by training the target-domain encoder subnetwork to encode target-domain data, and training the source-domain decoder subnetwork to synthesize source-domain data samples from encoded target-domain data, using one or more target-domain data samples of the target-domain dataset; and also by training the source-domain encoder subnetwork to encode source-domain data, and training the target-domain decoder subnetwork to synthesize target-domain data samples from encoded source-domain data, using one or more source-domain data samples of the source-domain dataset. One or more source-domain data samples of the plurality of source-domain data samples are processed, using the source-domain encoder subnetwork and the target-domain decoder subnetwork, to generate a respective one or more synthetic target-domain data samples. The target-domain model is trained to perform a prediction task on target domain data using the one or more synthetic target-domain data samples, and the respective label information of the one or more source-domain target samples.

In some examples, performing self-supervised learning to train the domain translation neural network comprises: enabling one or more intra-target-domain skip connections between one or more intermediate layers of the target-domain encoder subnetwork and one or more intermediate layers of the target-domain decoder subnetwork; repeating one or more times: processing a source-domain data sample of the source-domain dataset using the target-domain encoder subnetwork and the target-domain decoder subnetwork to generate a reconstructed target-domain data sample; generating a target data identity loss based on a comparison of the target-domain data sample and the reconstructed target-domain data sample; and adjusting a plurality of learned parameters of the target-domain encoder subnetwork and the target-domain decoder subnetwork based on the target data identity loss; enabling one or more intra-source-domain skip connections between one or more intermediate layers of the source-domain encoder subnetwork and one or more intermediate layers of the source-domain decoder subnetwork; and repeating one or more times: processing a source-domain data sample of the target-domain dataset using the target-domain encoder subnetwork and the source-domain decoder subnetwork to generate a reconstructed source-domain data sample; generating a source data identity loss based on a comparison of the source-domain data sample and the reconstructed source-domain data sample; and adjusting a plurality of learned parameters of the source-domain encoder subnetwork and the source-domain decoder subnetwork based on the source data identity loss. Performing adversarial learning to train the domain translation neural network comprises: training a target-domain discriminator model to identify target-domain data samples using one or more target-domain data samples of the target-domain dataset; disabling the intra-source-domain skip connections; enabling one or more cross-domain skip connections between one or more intermediate layers of the source-domain encoder subnetwork and one or more intermediate layers of the target-domain decoder subnetwork; and repeating one or more times: processing a source-domain data sample of the source-domain dataset using the source-domain encoder subnetwork and the target-domain decoder subnetwork to generate a synthetic target-domain data sample; generating an adversarial loss, using the target-domain discriminator model, based on the synthetic target-domain data sample; and adjusting a plurality of learned parameters of the source-domain encoder subnetwork and the target-domain decoder subnetwork based on the adversarial loss.

In some examples, the method further comprises computing mean information and covariance information of the target-domain dataset; and after each repetition of processing a source-domain data sample of the source-domain dataset using the source-domain encoder subnetwork and the target-domain decoder subnetwork to generate a synthetic target-domain data sample: generating a statistical loss based on a comparison between mean information of the synthetic target-domain data sample and the mean information of the target-domain dataset, and covariance information of the synthetic target-domain data sample and the covariance information of the target-domain dataset; and wherein the plurality of learned parameters of the source-domain encoder subnetwork and the target-domain decoder subnetwork are adjusted based on the adversarial loss and the statistical loss.

In some examples, the target-domain discriminator model comprises: one or more intermediate layers; an output layer; a first head configured to process an output of the output layer to generate a first head loss; and a second head configured to process an output of one of the intermediate layers to generate a second head loss; and the adversarial loss is generated by the target-domain discriminator model based on the first head loss and the second head loss.

In some examples, the method further comprises obtaining a source-domain model trained to perform the prediction task on source-domain data. Training the target-domain model to perform the prediction task on target domain data comprises performing unsupervised learning to train the target-domain model by: repeating one or more times: selecting a selected source-domain data sample from the source-domain dataset; processing the selected source-domain data sample, using the source-domain model, to generate source-domain model prediction information; processing the selected source-domain data sample, using the source-domain encoder subnetwork of the domain translation neural network, to generate a synthetic target-domain data sample; processing the synthetic target-domain data sample, using the target-domain model, to generate target-domain model prediction information; generating a task consistency loss based on a comparison of the source-domain model prediction information and the target-domain model prediction information; generating a task loss based on a comparison of the target-domain model prediction information and the label information of the selected source-domain data sample; and adjusting a plurality of learned parameters of the target-domain model, the source-domain encoder subnetwork, and the target-domain decoder subnetwork based on the task consistency loss and the task loss.

In some examples, each of one or more target-domain data samples of the target-domain dataset is associated with respective label information; and training the target-domain model to perform the prediction task on target domain data further comprises, prior to performing unsupervised learning stage to train the target-domain model, performing semi-supervised learning to train the target-domain model by repeating one or more times: selecting a selected target-domain data sample associated with respective label information from the target-domain dataset; processing the selected target-domain data sample, using the target-domain model, to generate target-domain model prediction information; generating a task loss based on a comparison of the target-domain model prediction information and the label information of the selected target-domain data sample; and adjusting a plurality of learned parameters of the target-domain model based on the task loss.

In some examples, the target-domain model comprises an encoder subnetwork and a decoder subnetwork. Training the target-domain model to perform the prediction task on target domain data further comprises, prior to performing semi-supervised learning to train the target-domain model, performing self-supervised learning to train the target-domain model by: providing an auxiliary decoder subnetwork; and repeating one or more times: selecting a selected target-domain data sample from the target-domain dataset; processing the selected target-domain data sample, using the encoder subnetwork and the auxiliary decoder subnetwork, to generate a reconstructed selected target-domain data sample; generating an identity loss based on a comparison of the reconstructed selected target-domain data sample and the selected target-domain data sample; and adjusting a plurality of learned parameters of the encoder subnetwork and the auxiliary decoder subnetwork based on the identity loss.

In some examples, obtaining the source-domain model comprises training the source-domain model, using supervised learning, to perform the prediction task on source-domain data by: repeating one or more times: selecting a selected source-domain data sample from the target-domain dataset; processing the selected source-domain data sample, using the source-domain model, to generate source-domain model prediction information; generating a task loss based on a comparison of the source-domain model prediction information and the respective label information of the selected source-domain data sample; and adjusting a plurality of learned parameters of the source-domain model based on the task loss.

In some examples, the plurality of target-domain data samples comprises a plurality of imaging data samples obtained in a first context, each imaging data sample comprising a two-dimensional matrix of data points, each data point having one or more channels; the plurality of source-domain data samples comprises a plurality of imaging data samples obtained in a second context, each imaging data sample comprising a two-dimensional matrix of data points, each data point having one or more channels; and the prediction task is a data point classification task for classifying data points of an imaging data sample.

In some examples, the plurality of imaging data samples obtained in the first context comprise a plurality of LIDAR point cloud frames obtained in the first context. The plurality of imaging data samples obtained in the second context comprise a plurality of LIDAR point cloud frames obtained in the second context. The data points of the imaging data samples are points of the point clouds. The prediction task is a semantic segmentation task for classifying each point of a point cloud frame into one of a plurality of classes.

In some examples, obtaining the target-domain dataset comprises preprocessing a plurality of raw target-domain data samples to generate the plurality of target-domain data samples; obtaining the source-domain dataset comprises preprocessing a plurality of raw source-domain data samples to generate the plurality of source-domain data samples; and preprocessing a data sample comprises performing spherical projection normalization on the data sample.

In some examples, the plurality of target-domain data samples comprises a plurality of LIDAR point cloud frames obtained in a first context. The plurality of source-domain data samples comprises a plurality of LIDAR point cloud frames obtained in a second context. The prediction task is a semantic segmentation task for classifying each point of a point cloud frame into one of a plurality of classes.

In some aspects, the present disclosure describes a non-transitory processor-readable medium having machine-executable instructions stored thereon which, when executed by a processor of a device, cause the device to perform a number of steps. A target-domain dataset is obtained, comprising a plurality of target-domain data samples. A source-domain dataset is obtained, comprising a plurality of source-domain data samples. Each source-domain data sample is associated with respective label information. Self-supervised learning is performed to train a domain translation neural network, comprising a target-domain encoder subnetwork, a target-domain decoder subnetwork, a source-domain encoder subnetwork, and a source-domain decoder subnetwork, by training the target-domain encoder subnetwork to encode target-domain data, and training the target-domain decoder subnetwork to reconstruct target-domain data samples from encoded target-domain data, using one or more target-domain data samples of the target-domain dataset; and also by training the source-domain encoder subnetwork to encode source-domain data, and training the source-domain decoder subnetwork to reconstruct source-domain data samples from encoded source-domain data, using one or more source-domain data samples of the source-domain dataset. Adversarial learning is performed to train the domain translation neural network by training the target-domain encoder subnetwork to encode target-domain data, and training the source-domain decoder subnetwork to synthesize source-domain data samples from encoded target-domain data, using one or more target-domain data samples of the target-domain dataset; and also by training the source-domain encoder subnetwork to encode source-domain data, and training the target-domain decoder subnetwork to synthesize target-domain data samples from encoded source-domain data, using one or more source-domain data samples of the source-domain dataset. One or more source-domain data samples of the plurality of source-domain data samples are processed, using the source-domain encoder subnetwork and the target-domain decoder subnetwork, to generate a respective one or more synthetic target domain data samples. A target-domain model is trained to perform a prediction task on target domain data using the one or more synthetic target-domain data samples, and the respective label information of the one or more source-domain target samples.

Example embodiments described herein may provide an end-to-end training process, which can be run once in order to fully train the domain transformation neural network and the target-domain model. In contrast, many existing approaches (such as Cycada) require multiple iterations of executing software, saving pieces of generated code, and executing the saved code.

Based on testing data, example embodiments described herein in the context of semantic segmentation using point cloud data may provide a trained target-domain model 312 that generalizes reasonably well when trained with a small set of labeled target-domain point cloud frames (e.g., ~1000 labeled nuScenes point cloud frames) and evaluated with a target-domain validation set of labeled point cloud frames (e.g., labeled nuScenes point cloud frames). The accuracy of the trained target-domain model 312, measured as mean Intersection over Union (mIoU), is reasonably close (~30%) to that of a model trained using a fully-labeled target-domain dataset (e.g. a target-domain model 312 trained using a fully-labeled nuScenes dataset), thereby outperforming existing domain adaptation approaches.

BRIEF DESCRIPTION OF THE DRAWINGS

Reference will now be made, by way of example, to the accompanying drawings which show example embodiments of the present application, and in which:

FIG. 10 is a flowchart illustrating steps of an example method for using hybrid learning to train a target-domain model to perform a prediction task, in accordance with examples described herein.

Similar reference numerals may have been used in different figures to denote similar components.

DESCRIPTION OF EXAMPLE EMBODIMENTS

Example embodiments will be described with reference to training a target-domain model to perform a semantic segmentation task on point cloud data obtained from LiDAR sensors. However, it will be appreciated that the systems, devices, methods, and computer-readable media described herein are equally applicable to training a target-domain model to perform a different prediction task, and/or to perform the prediction task on different types of data. For example, the techniques described herein could be used to train a target-domain model to perform an instance segmentation task on 2D camera image data.

Figure 1A:
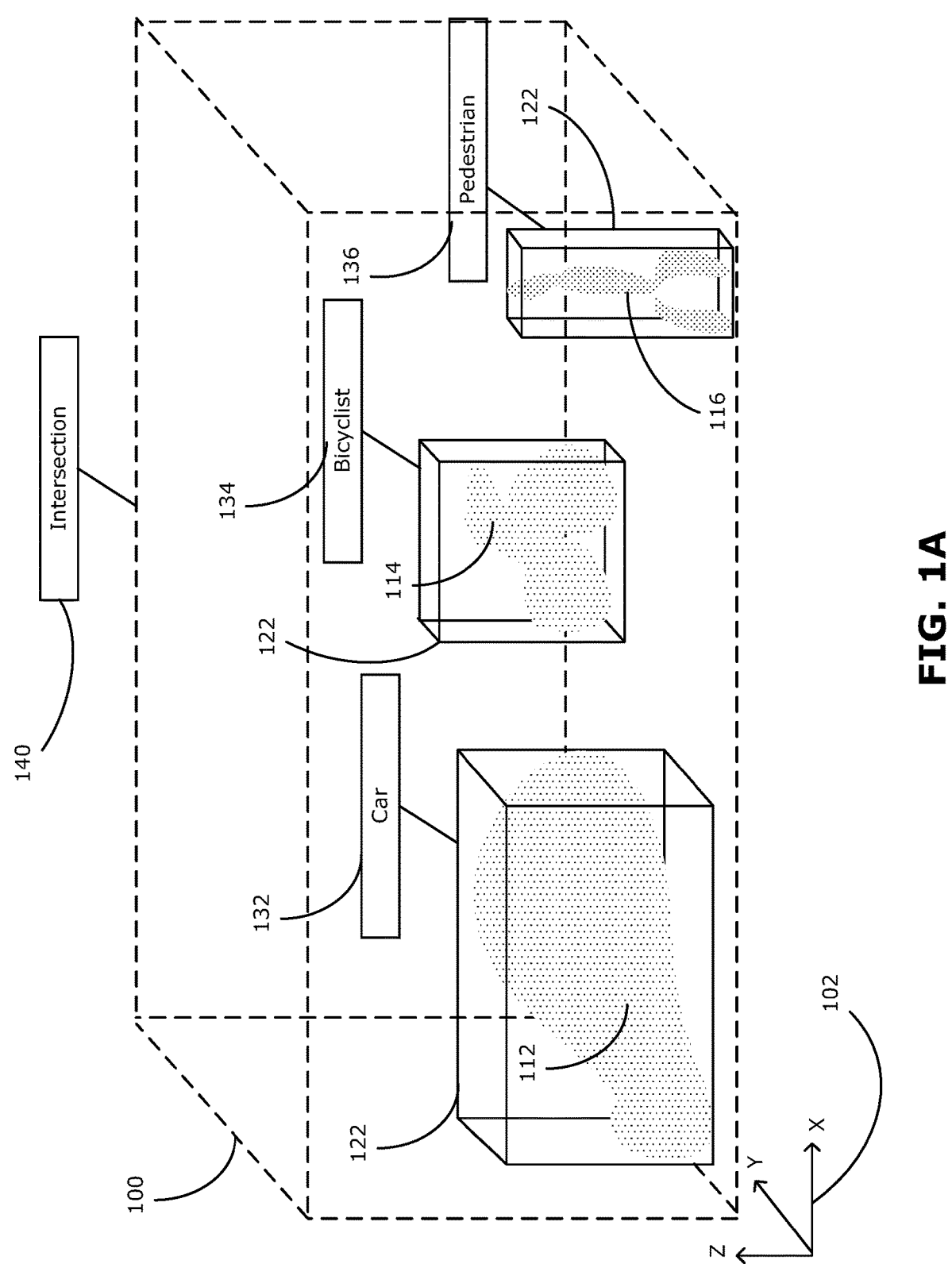
FIG. 1A is an upper front right side perspective view of an example simplified point cloud frame, providing an operating context for embodiments described herein.

FIG. 1A shows an example simplified point cloud frame 100, with points mapped to a three-dimensional coordinate system 102 X, Y, and Z, wherein the Z dimension extends upward, typically as defined by the axis of rotation of the LIDAR sensor or other panoramic sensor generating the point cloud frame 100. The point cloud frame 100 includes a number of points, each of which may be represented by a set of coordinates (x, y, z) within the point cloud frame 100 along with a vector of other values, such as an intensity value indicating the reflectivity of the object corresponding to the point. Each point represents a reflection of light emitted by a laser at a point in space relative to the LIDAR sensor corresponding to the point coordinates. Whereas the example point cloud frame 100 is shown as a box-shape or rectangular prism, it will be appreciated that a typical point cloud frame captured by a panoramic LIDAR sensor is typically a 360 degree panoramic view of the environment surrounding the LIDAR sensor, extending out to a full detection range of the LIDAR sensor. The example point cloud frame 100 is thus more typical of a small portion of an actual LIDAR-generated point cloud frame, and is used for illustrative purposes.

The points of the point cloud frame 100 are clustered in space where light emitted by the lasers of the LIDAR sensor are reflected by objects in the environment, thereby resulting in clusters of points corresponding to the surface of the object visible to the LIDAR sensor. A first cluster of points 112 corresponds to reflections from a car. In the example point cloud frame 100, the first cluster of points 112 is enclosed by a bounding box 122 and associated with an object class label, in this case the label "car" 132. A second cluster of points 114 is enclosed by a bounding box 122 and associated with the object class label "bicyclist" 134, and a third cluster of points 116 is enclosed by a bounding box 122 and associated with the object class label "pedestrian" 136. Each point cluster 112, 114, 116 thus corresponds to an object instance: an instance of object class "car", "bicyclist", and "pedestrian" respectively. The entire point cloud frame 100 is associated with a scene type label 140 "intersection" indicating that the point cloud frame 100 as a whole corresponds to the environment near a road intersection (hence the presence of a car, a pedestrian, and a bicyclist in close proximity to each other).

In some examples, a single point cloud frame may include multiple scenes, each of which may be associated with a different scene type label 140. A single point cloud frame may therefore be segmented into multiple regions, each region being associated with its own scene type label 140. Example embodiments will be generally described herein with reference to a single point cloud frame being associated with only a single scene type; however, it will be appreciated that some embodiments may consider each region in a point cloud frame separately for point cloud object instance injection using the data augmentation methods and systems described herein.

Each bounding box 122 is sized and positioned, each object label 132, 134, 136 is associated with each point cluster, and the scene label is associated with the point cloud frame 100 using data labeling techniques known in the field of machine learning for generating labeled point cloud frames.

The labels and bounding boxes of the example point cloud frame 100 shown in FIG. 1A correspond to labels applied in the context of object detection, and the example point cloud frame could therefore be included in a training dataset that is used to train a machine learned model for object detection on point cloud frames. However, methods and systems described herein are equally applicable not only to models for object detection on point cloud frames, but also models for segmentation on point cloud frames, including semantic segmentation, instance segmentation, or panoptic segmentation on point cloud frames. For example, a point cloud frame labeled using semantic segmentation might include multiple "cars" such as 112, but each point in each such point cloud would be labeled with the same "car" label; the individual object instances corresponding to each car in the real-world scene would not be segmented or distinguished from each other by a semantic segmentation labeling process. By the same token, semantic segmentation would not define the labeled point clouds 112, 114, 116 using bounding boxes; rather, each point within each such point cloud would simply be associated with a semantic label indicating a category (e.g., "car", "bicyclist", "pedestrian").

Figure 1B:
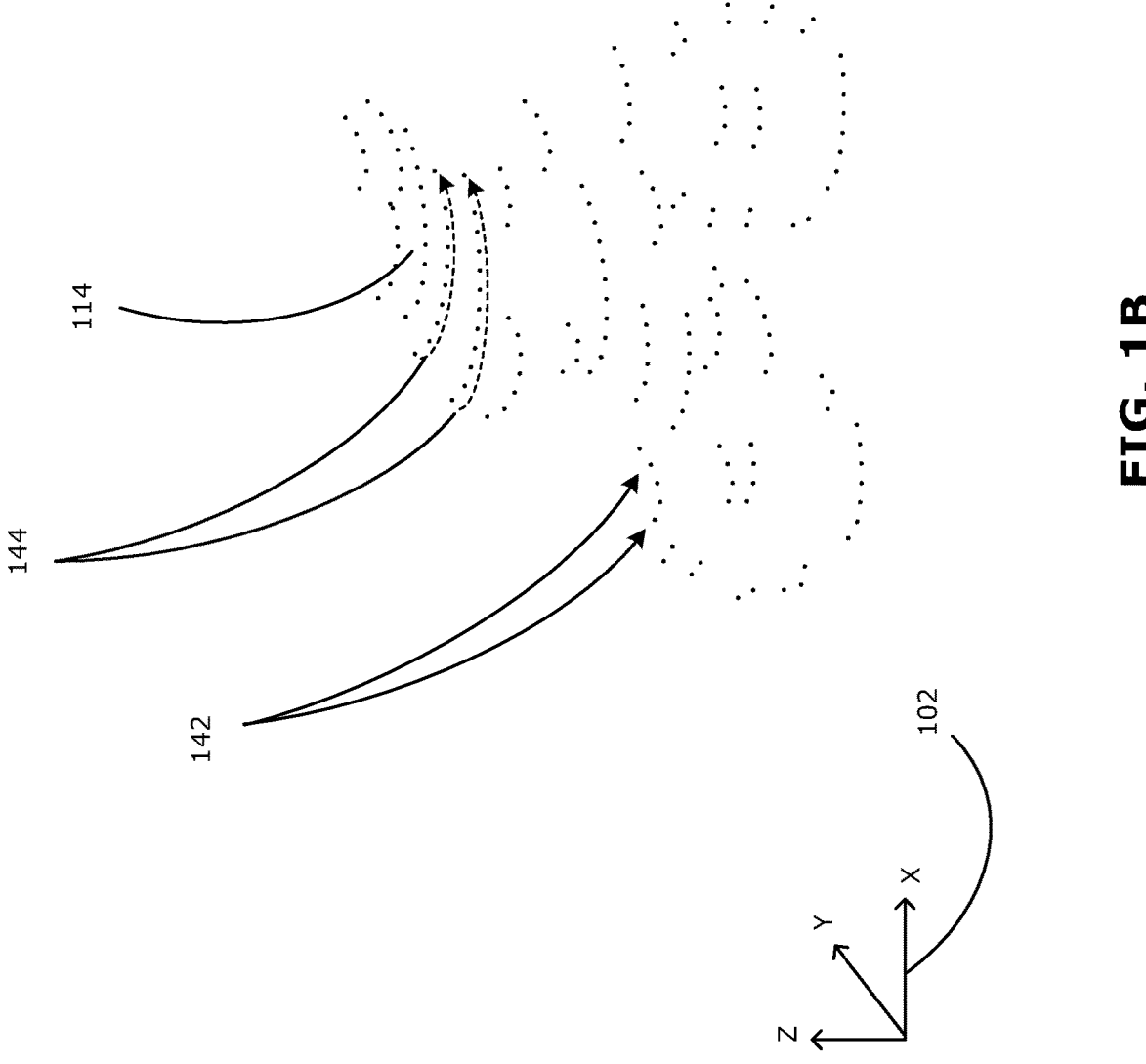
FIG. 1B is an upper front right side perspective view of an example point cloud object instance labelled with a "bicyclist" object class, suitable for use by embodiments described herein.

FIG. 1B shows a detailed view of the second cluster of points 114 (i.e. a cluster of points for a "bicyclist" point cloud object instance) from FIG. 1A within the point cloud frame 100 generated by a LIDAR sensor (or other 3D sensor, as described above), with the points 142 arranged along scan lines 144. The second cluster of points 114 thus includes a plurality of scan lines 144, each scan line 144 comprising a subset of the plurality of points 142 of the second cluster of points 114. The scan lines 144 correspond to points at which light emitted by a laser of the LIDAR sensor, moving along an azimuth direction in between taking readings, is reflected by an object, in this case a bicyclist, and detected by the LIDAR sensor. In the illustrated example, the azimuth direction defining the direction of the scan lines 144 is roughly horizontal (i.e. in the X-Y plane defined by the coordinate system 102 of the point cloud frame). In the context of a point cloud frame 100 labeled using semantic segmentation, each point 142 within the second cluster of points 114 may be associated with a semantic label, such as the "bicyclist" label 134.

It will thus be appreciated that a point cloud frame 100 generated using a LIDAR sensor typically consists of a plurality of points 142 arranged along scan lines 144, the scan lines 144 running roughly parallel to each other. A LIDAR point cloud frame 100 may thus be regarded as a 2D matrix of points 142, wherein each scan line 144 corresponds to a row or column of the matrix, and wherein the depth (i.e. Z) value of each point is encoded as a channel value within the matrix element corresponding to the point 142. A further channel of each point 142 may encode an intensity value, and so on. Thus, in some embodiments point cloud frames generated by LiDAR sensors can be processed using techniques similar to those employed to process 2D camera images, which also consist of 2D matrices of pixels, each pixel having one or more channels encoding values such as red, green, and blue color values. In the present disclosure, point cloud frames 100 and camera images may both be referred to as "imaging data samples", and references herein to points in a point cloud frame may be understood in the context of 2D camera images to be analogous to pixels. The techniques herein may thus be applied to data samples of various types, but in particular to imaging data samples, using the techniques described herein in the context of a data sample being a LIDAR point cloud frame 100.

Figure 2:
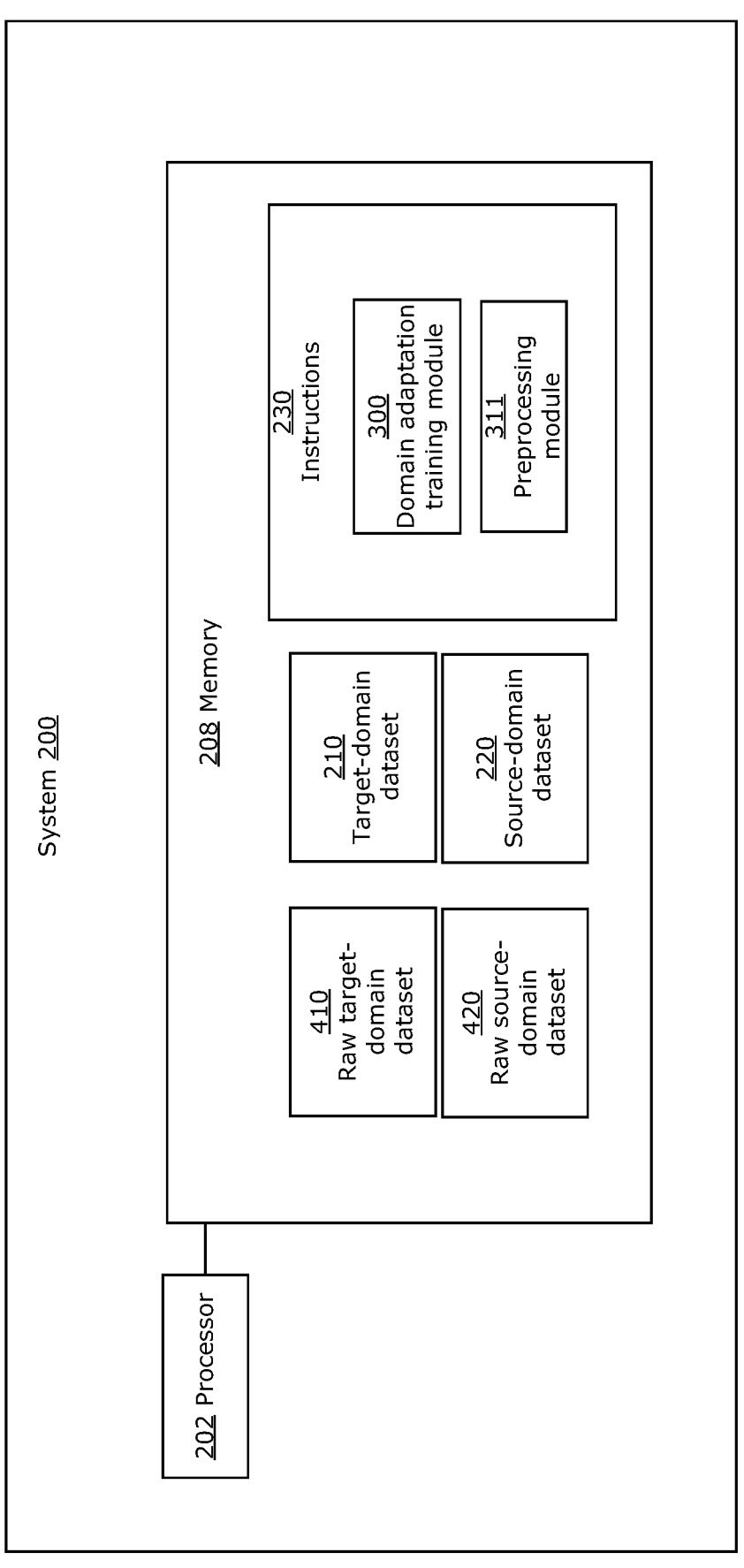
FIG. 2 is a block diagram illustrating some components of an example system for using hybrid learning to train a target-domain model to perform a prediction task, in accordance with examples described herein.

FIG. 2 is a block diagram of a computing system 200 (hereinafter referred to as system 200) for training a target-domain model to perform a prediction task using hybrid learning. Although an example embodiment of the system 200 is shown and discussed below, other embodiments may be used to implement examples disclosed herein, which may include components different from those shown. Although FIG. 2 shows a single instance of each component of the system 200, there may be multiple instances of each component shown.

The system 200 includes one or more processors 202, such as a central processing unit, a microprocessor, an application-specific integrated circuit (ASIC), a field-programmable gate array (FPGA), a dedicated logic circuitry, a tensor processing unit, a neural processing unit, a tensor processing unit, dedicated artificial intelligence processing unit, an accelerator, or combinations thereof. The one or more processors 202 may collectively be referred to as a "processor device" or "processor 202".

The system 200 includes one or more memories 208 (collectively referred to as "memory 208"), which may include a volatile or non-volatile memory (e.g., a flash memory, a random access memory (RAM), and/or a read-only memory (ROM)). The non-transitory memory 208 may store machine-executable instructions for execution by the processor 202, such as to carry out examples described in the present disclosure. A set of machine-executable instructions 230 defining a domain adaptation training module 300 and a preprocessing module 311 are shown stored in the memory 208, which may each be executed by the processor 202 to perform the steps of the methods described herein. The operation of the system 200 in executing the set of machine-executable instructions 230 defining the domain adaptation training module 300 and preprocessing module 311 is described below with reference to FIG. 3. The machine-executable instructions 230 defining the domain adaptation training module 300 and preprocessing module 311 are executable by the processor 202 to perform the functions of each respective component or submodule thereof shown in FIGS. 3-9. The memory 208 may include other machine-executable instructions, such as for implementing an operating system and other applications or functions.

The memory 208 stores one or more datasets, such as a raw target-domain dataset 410, a raw source-domain dataset 420, a target-domain dataset 210, and a source-domain dataset 220. In example embodiments described herein, the raw target-domain dataset 410 is a sparsely-labeled dataset for a target domain (e.g., the nuScenes dataset with only a small number of the point cloud frames associated with semantic ground-truth labels), and the raw source-domain dataset 420 is a fully-labeled dataset for a source domain (e.g., the SemantiKITTI dataset with all point cloud frames associated with semantic ground-truth labels). Each point cloud frame 100 within each raw dataset 410, 420 is considered a raw (i.e., non-preprocessed) data sample, and the label(s) associated with each raw data sample (i.e., stored in the raw dataset 410, 420 in association with the respective raw data sample) is considered to be label information of the respective raw data sample. The target-domain dataset 210 and source-domain dataset 220 are generated by the preprocessing module 311 by preprocessing the raw data samples of the raw datasets 410, 420, as described below with reference to FIG. 4.

The memory 208 may also store other data, information, rules, policies, and machine-executable instructions described herein.

In some examples, the system 200 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 208 to implement data storage, retrieval, and caching functions of the system 200.

The components of the system 200 may communicate with each other via a bus, for example. In some embodiments, the system 200 is a distributed computing system such as a cloud computing system and may include multiple computing devices in communication with each other over a network, as well as optionally one or more additional components. The various operations described herein may be performed by different devices of a distributed system in some embodiments.

Figure 3:
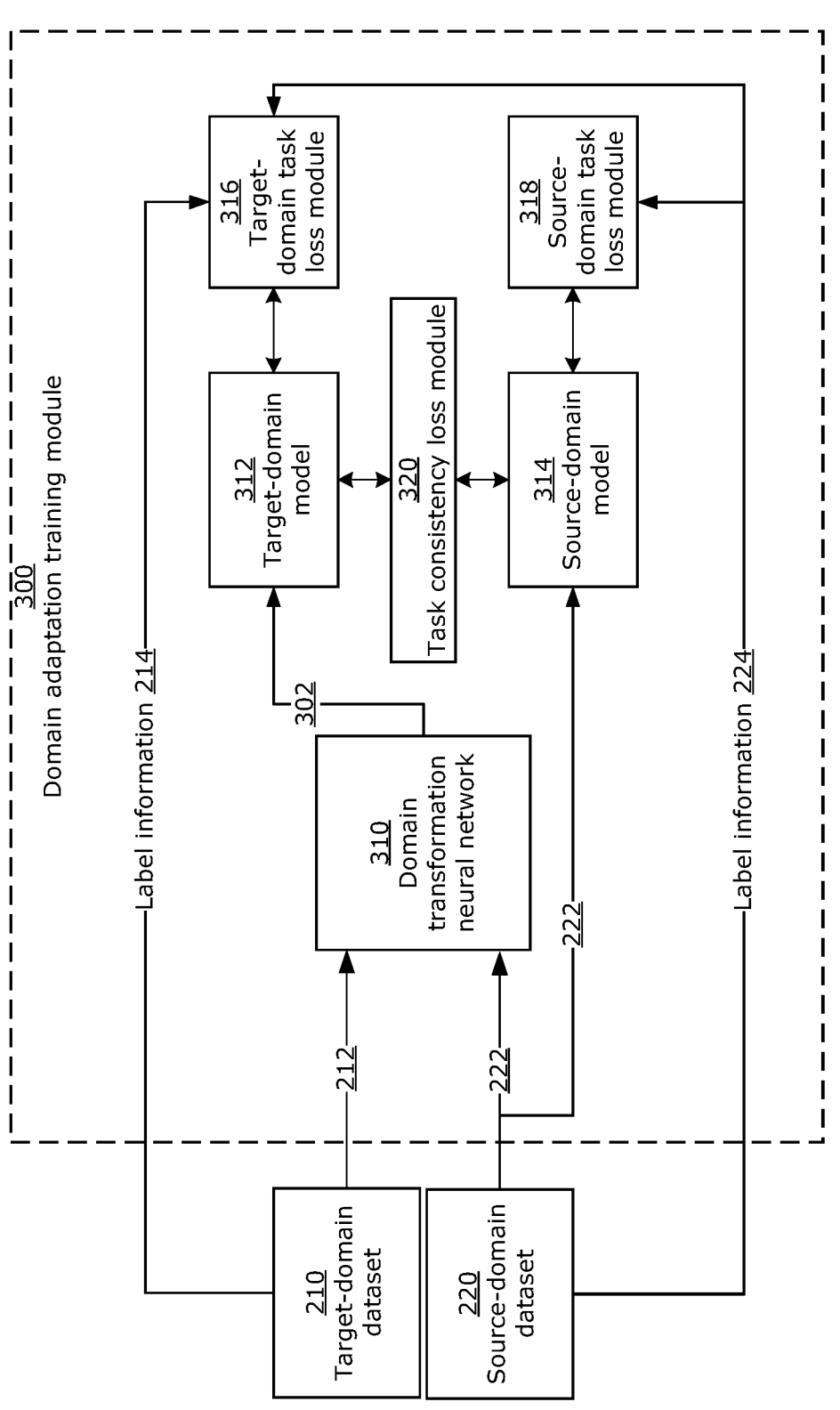
FIG. 3 is a block diagram illustrating the operation of the domain adaptation training module of FIG. 2.

FIG. 3 illustrates the operation of an example domain adaptation training module 300 executed by the processor 202 of the system 200. In the illustrated embodiment, the domain adaptation training module 300 includes several functional components or submodules: a domain transformation neural network 310, a target-domain model 312, a source-domain model 318, a task consistency loss module 320, a target-domain task loss module 316, and a source-domain task loss module 318. Some of these functional components or submodules may include further sub-components, or may make use of auxiliary sub-components, as shown in further detail in FIGS. 5-9; all such sub-components are considered part of the domain adaptation training module 300.

The domain adaptation training module 300 and preprocessing module 311 are executed by the processor 202 to perform the steps of an example method 1000 shown in FIG. 1000. The performance of the various steps of the method 1000 will be described with reference to FIGS. 4-9.

FIG. 10 is a flowchart showing steps of an example method 1000 for method for training the target-domain model 312 to perform a prediction task (such as semantic segmentation in the examples described herein) using hybrid learning. The purpose of the method 1000 is to generate a trained target-domain model 312 capable of performing the prediction task on unlabeled data samples from the target domain. To do this in spite of the sparse labeling of the target-domain dataset 210, domain adaptation is used, leveraging the fully-labeled source-domain dataset 220, the small number of labeled data samples in the target-domain dataset 210, and the large number of unlabeled data samples in the target-domain dataset 210. Training proceeds in a number of stages, each stage using a different type of machine learning, as described in further detail below.

The method 1000 begins with steps 1002 and 1004. At 1002, the target-domain dataset 210 is obtained, and at 1004, the source-domain dataset 220 is obtained. In some embodiments, the target-domain dataset 210 and the source-domain dataset 220 are obtained by preprocessing the raw target-domain dataset 410 and the raw source-domain dataset 420, respectively, as shown in FIG. 4.

Figure 4:
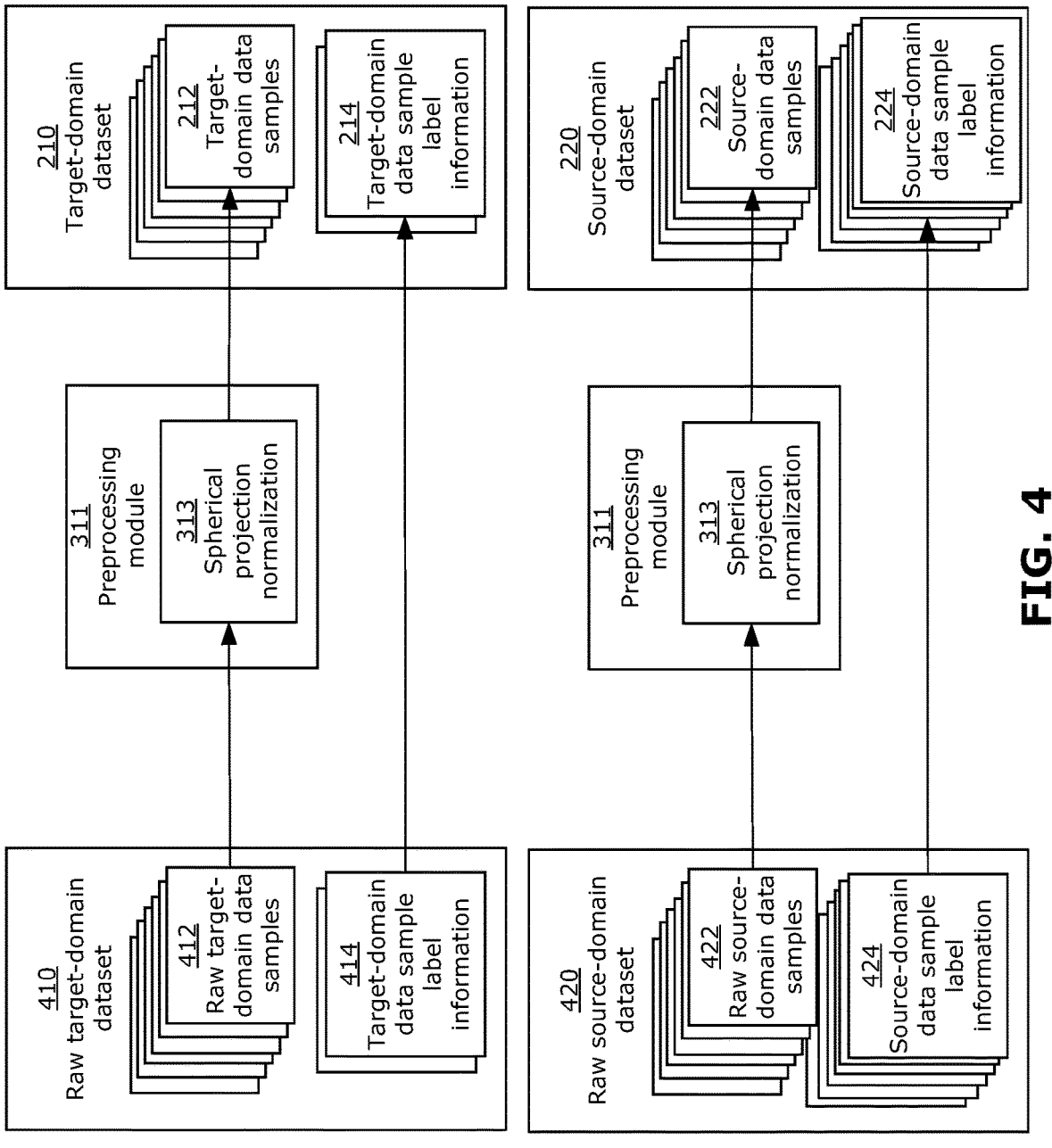
FIG. 4 is a block diagram illustrating the operation of the preprocessing module of FIG. 2.

FIG. 4 shows a preprocessing operation performed by the preprocessing module 311 to generate the target-domain dataset 210 and the source-domain dataset 220 by preprocessing the raw data samples of the raw target-domain dataset 410 and raw source-domain dataset 420, respectively. Each raw target-domain data sample 412 in the raw target-domain dataset 410 and each raw source-domain data sample 422 in the raw source-domain dataset 420 is a point cloud frame (e.g., from the nuScenes domain and the SemantiKITTI respectively); all of the raw source-domain data samples 422 in the raw source-domain dataset 420 are stored in association with source-domain data sample label information 424 (i.e. ground-truth label information), whereas only a small number (e.g., 1000) of the raw target-domain data samples 412 in the raw target-domain dataset 410 are stored in association with target-domain data sample label information 414.

The preprocessing module 311 performs one or more preprocessing operations on the data samples 412, 422 of the raw datasets 410, 420 to generate the target-domain data samples 212 and source-domain data samples 222 of the target-domain dataset 210 and source-domain dataset 220 respectively. In some embodiments, the one or more preprocessing operations include a spherical projection normalization operation performed by spherical projection normalization block 313. In some embodiments, the one or more processing operations include preprocessing the raw data samples 412, 422 using standard techniques described in the SalsaNet reference cited above and/or the Squeezeseg system described by B. Wu, X. Zhou, S. Zhao, X. Yue, and K. Keutzer, "Squeezesegv2: Improved model structure and unsupervised domain adaptation for road-object segmentation from a lidar point cloud", in 2019 International Conference on Robotics and Automation (ICRA), pages 4376-4382, IEEE, 2019. These techniques produce a 64×2048×5 spherical projection "range" image (referred to hereinafter as an image), wherein the five channels correspond to [X, Y, Z, range, remission]. It will be appreciated that different embodiments may preprocess various types of data samples using different techniques to facilitate the training of the target-domain model 312 to perform various types of prediction tasks according to method 1000.

The target-domain data sample label information 414 and source-domain data sample label information 424 are copied from the raw datasets 410, 420 unchanged, populating the preprocessed datasets 210, 220 with target-domain data sample label information 214 and source-domain data sample label information 224 respectively. In some embodiments, the label information 214, 224 associated with each data sample 212, 222 comprises a ground-truth (GT) label map indicating semantic segmentation ground truth labels, i.e. a map corresponding to the 64×2048 2D matrix elements of each data sample, wherein each element is associated with a GT label indicating a semantic category (e.g., "car" or "pedestrian"). In some embodiments, each GT label map is in an image format in which each pixel has an integer value indicating a class identifier for the pixel (e.g., "car"=1, "pedestrian"=2).

Returning to FIG. 10, method 1000 then proceeds to step 1006. At step 1006, a source-domain model 314 trained to perform the prediction task on source-domain data is obtained. In some embodiments, the trained source-domain model 314 is obtained by training the source-domain model 314, using supervised learning and the source-domain dataset 220, to perform the prediction task on source-domain data, as shown in FIG. 5.

Figure 5:
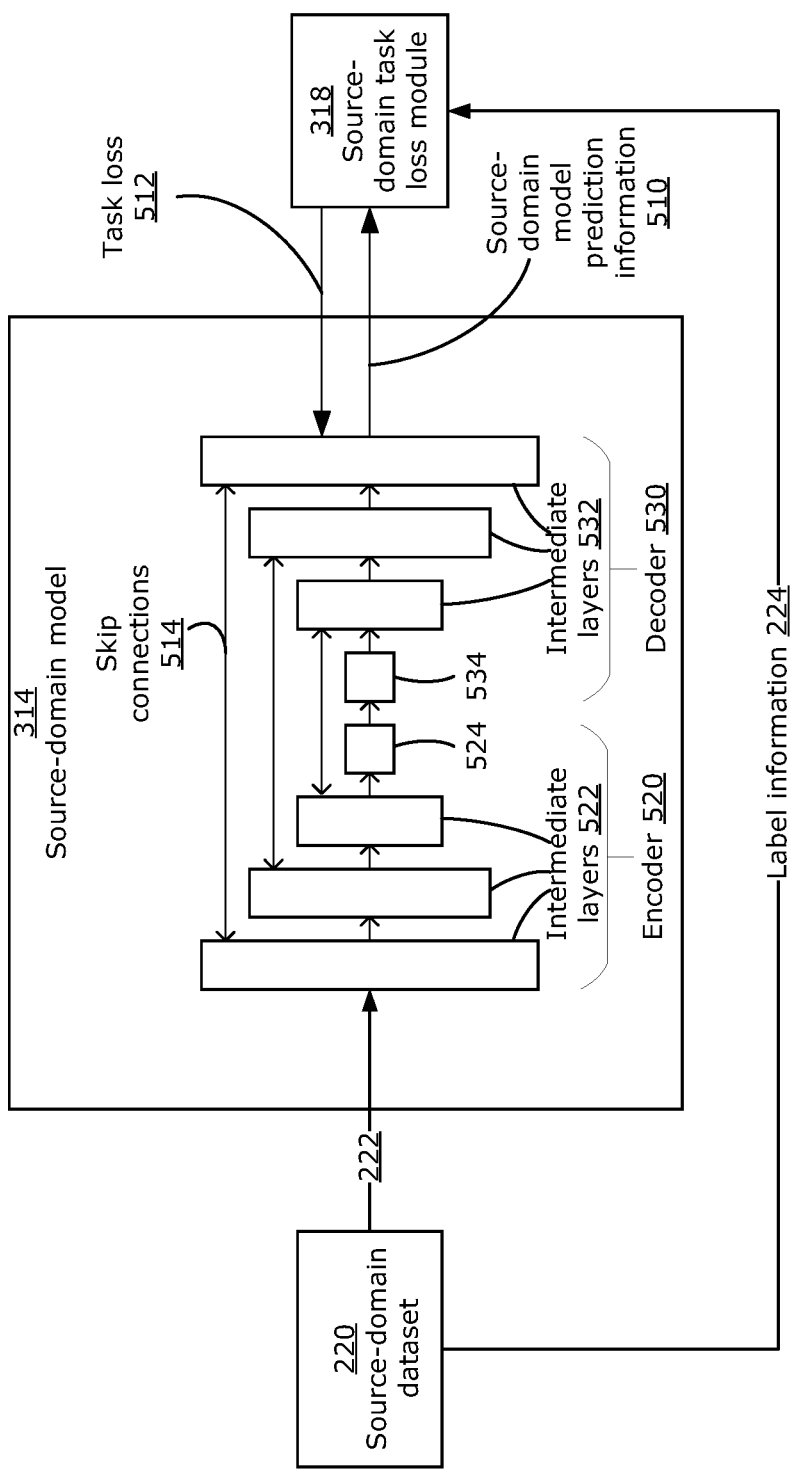
FIG. 5 is a block diagram illustrating the source-domain model of FIG. 3 during a supervised learning stage.

FIG. 5 shows the source-domain model 314 being trained using supervised learning and the source-domain dataset 220 at step 1006. The training of the source-domain model 314 (referred to as a supervised learning stage) may be performed using conventional supervised learning techniques and the source-domain dataset 220. A source-domain data sample 222 from the source-domain dataset 220 is provided as input to the source-domain model 314 and propagated forward through the layers of the source-domain model 314. The source-domain model 314 may be an artificial neural network, such as a convolutional neural network, configured to perform the prediction task on data samples, such as source-domain data samples 222 comprising preprocessed 64×2048×5 source-domain images as described above with reference to FIG. 4. The source-domain model 314 includes an encoder subnetwork 520 and a decoder subnetwork 530, each of which includes a plurality of layers. Each layer includes neurons that process inputs to generate activation maps, which may be processed further by one or more supplementary operations (such as smoothing, down-sampling, averaging, or normalization operations) before being provided as input to a subsequent layer. The encoder subnetwork 520 includes one or more intermediate layers 522 and an output layer 524; the activation map generated by the output layer 524, which may be regarded as encoding features extracted from the source-domain data sample 222, is provided as input to an input layer 534 of the decoder subnetwork 530. The subsequent intermediate layers 532 of the decoder subnetwork 530 may be regarded as decoding the features encoded in the activation map generated by the output layer 524 of the encoder subnetwork 520 to generate, at a logits layer (not shown) of the source-domain model 314, logits representative of a non-normalized probability distribution of class membership in each of a plurality of classes (e.g., "car", "pedestrian") of each pixel of the input source-domain data sample 222. A softmax function may be applied to the logits to normalize the probability distribution, and a maximum class membership probability may be selected for each pixel to generate a semantic label for the pixel (e.g., a pixel with normalized class membership probabilities ["car"=0.8, "pedestrian"=0.2] would be classified as a "car" pixel). The predicted class membership information for the source-domain data sample is referred to as source-domain model prediction information 510. In some embodiments, as described above, a label map may be used to encode the source-domain model prediction information 510, such as a 64×2048 image in which each pixel encodes the predicted class membership (e.g., "car"=1) of the corresponding pixel of the preprocessed 64×2048×5 source-domain data sample 222.

In some embodiments, the source-domain model 314 includes one or more skip connections 514 between the intermediate layers 522 of the encoder subnetwork 520 and the intermediate layers 532 of the decoder subnetwork 530, in order to preserve information from earlier layers. The skip connections 514 provide the output of the intermediate layers 522 of the encoder subnetwork 520 (i.e. activation maps) as input to the intermediate layers 532 of the decoder subnetwork 530, typically by concatenating the activation map output of the previous layer (i.e. an intermediate layer 522) with the activation map output of the immediately prior layer (i.e. the layer immediately to the left of the receiving intermediate layer 532) to form a combined activation map used as input to the receiving layer. The use of skip connections in training neural networks is well known in the field of machine learning.

A source-domain task loss module 318 is used to generate a task loss 512 using an objective function (in this case, a prediction task loss function) configured to reinforce learning of the prediction task, by comparing the source-domain model prediction information 510 to the corresponding source-domain data sample label information 224 of the source-domain data sample 222. The task loss 512 is used to adjust the learned parameter values (e.g., neuron weights) of the source-domain model 314, for example using techniques such as back-propagation and gradient descent.

This process may be repeated one or more times to train the source-domain model 314. For example, each source-domain data sample 522 may be propagated forward through the source-domain model 314 one or more times until the weights of the source-domain model 314 converge, or until some other training termination condition is satisfied. In some embodiments, the training performed during this supervised training stage may be performed in batches, with learned parameter values being adjusted only after an entire batch of source-domain data samples 222 has been propagated forward through the source-domain model 314 and used to generate an entire batch of source-domain model prediction information 510. It will be appreciated that each of the training stages described herein may be performed or varied generally as described with reference to the supervised learning stage of step 1006, except as otherwise specified.

It will be appreciated that the supervised learning stage may be performed using conventional supervised learning techniques for image or point cloud segmentation tasks. However, the source-domain model prediction information 510 generated when the supervised learning stage is performed (i.e. at step 1006 of the method 1000) will be used in later steps of the method 1000 (specifically, when the unsupervised learning stage is performed at step 1018, shown in FIG. 9) to train the target-domain model 312 to generate target-domain model prediction information that is identical or very similar to the source-domain model prediction information 510. Thus, the source-domain model prediction information 510 may be stored in the memory 208 for using during step 1018.

After step 1006, the method 100 proceeds to step 1008. At 1008, a self-supervised learning stage is performed to at least partially train the domain translation neural network 310 using self-supervised learning to reconstruct data samples in the target domain and source domain. The operations performed by the self-supervised learning stage at step 1008 is are shown in FIG. 6A.

Figure 6A:
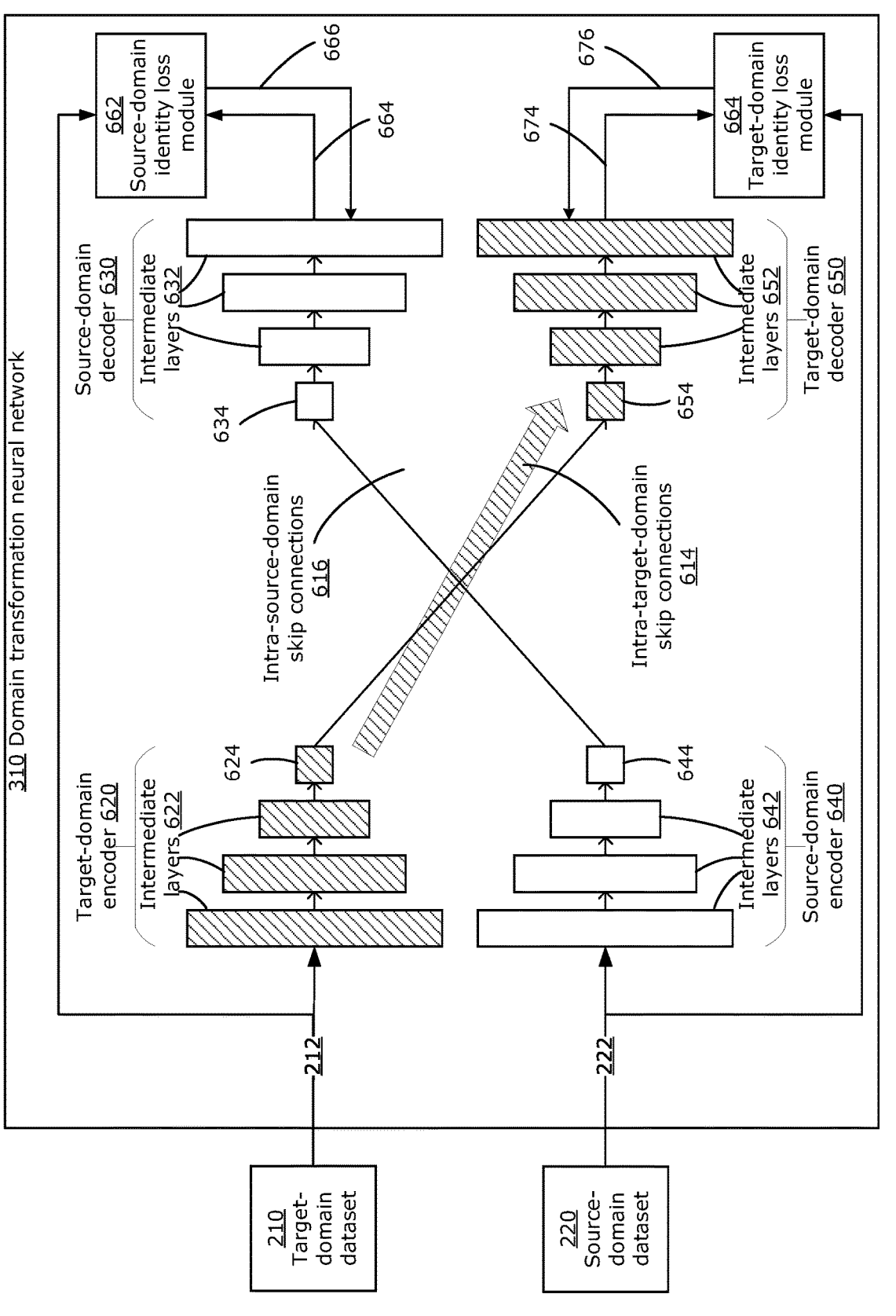
FIG. 6A is a block diagram illustrating the domain-translation neural network of FIG. 3 during a self-supervised learning stage.

FIG. 6A shows the domain-translation neural network 310 being at least partially trained to reconstruct data samples when the self-supervised learning stage is performed (i.e. during step 1008 of the method 1000). The domain translation neural network 310 includes a target-domain encoder subnetwork 620, a target-domain decoder subnetwork 650, a source-domain encoder subnetwork 640, and a source-domain decoder subnetwork 630.

A set of one or more intra-source-domain skip connections 616 and a set of one or more intra-target-domain skip connections 614 are enabled when the self-supervised learning stage is performed (i.e. during step 1008 of the method 1000), and are disabled for the other steps of the method 1000. The intra-target-domain skip connections 614 connect one or more intermediate layers 622 of the target-domain encoder subnetwork 620 to one or more intermediate layers 652 of the target-domain decoder subnetwork 650, and the same intra-source-domain skip connections 616 connect one or more intermediate layers 642 of the source-domain encoder subnetwork 640 to one or more intermediate layers 632 of the source-domain decoder subnetwork 630. In some embodiments, the intra-source-domain skip connections 616 and intra-target-domain skip connections 614 each consist of skip connections operating at several (e.g., three) different levels of image resolution: for example, three successive intermediate layers 622 of the target-domain encoder subnetwork 620 may output activation maps encoding features of the input image (i.e. the target-domain data sample 212) at three different levels of resolution (e.g., 2048 feature map values, followed by 512 feature map values, followed by 128 feature map values), and these activation maps encoded at three different levels of resolution may be concatenated to the inputs of three corresponding intermediate layers 652 of the target-domain decoder subnetwork 650 configured to receive and process activation maps at those three levels of resolution. The use of configurable skip connections (i.e., skip connections that can be selectively enabled or disabled) allow the subnetworks 620, 630, 640, 650 of the domain-translation neural network 310 to be trained for different tasks using different learning techniques during different steps of the method 1000.

When the self-supervised learning stage is performed (i.e. during step 1008 of method 1000), the subnetworks 620, 630, 640, 650 of the domain-translation neural network 310 are trained in two parallel pathways to perform two related tasks: the target-domain encoder subnetwork 620 and target-domain decoder subnetwork 650 are trained to reconstruct target-domain data samples 212, and the source-domain encoder subnetwork 640 and source-domain decoder subnetwork 630 are trained to reconstruct source-domain data samples 222. To train the target-domain encoder subnetwork 620 and target-domain decoder subnetwork 650, a target-domain data sample 212 is processed (i.e. encoded as an activation map encoding a set of features) by the target-domain encoder subnetwork 620. The output layer 624 of the target-domain encoder subnetwork 620 provides this activation map to the input layer 654 of the target-domain decoder subnetwork 650. The target-domain decoder subnetwork 650 decodes the received activation map by processing it using its input layer 654 and its successive intermediate layers 652, with the output of the final intermediate layer 652 being provided to an image-generative output layer (not shown) configured to generate an image having the same format as the input (i.e. a target-domain data sample 212). The generated image is referred to herein as a reconstructed target-domain data sample 674, as the target-domain encoder subnetwork 620 and target-domain decoder subnetwork 650 are being trained to reconstruct the target-domain data samples 312 used as inputs when the self-supervised learning stage is performed. A target-domain identity loss module 664 compares the reconstructed target-domain data sample 674 to the original target-domain data sample 312 provided as input, generating a target-domain identity loss 676 based on the comparison. The target-domain identity loss 676 is used to adjust the learned parameter values of the target-domain encoder subnetwork 620 and target-domain decoder subnetwork 650, using techniques such as back propagation and gradient descent. As described above with reference to the source-domain model 314 of FIG. 5, this process may be repeated one or more times to train the target-domain encoder subnetwork 620 and target-domain decoder subnetwork 650.

Training the source-domain encoder subnetwork 640 and source-domain decoder subnetwork 630 entails the same process used to train the target-domain encoder subnetwork 620 and target-domain decoder subnetwork 650, but involving instead the source-domain equivalents of each target-domain component or element described above. Thus, source-domain data sample 222 from the source-domain dataset 220 is processed by the source-domain encoder subnetwork 640 and source-domain decoder subnetwork 630, whose intermediate layers 642, 632 are in communication via one or more intra-source-domain skip connections 616, and which provide the output of the output layer 644 of the source-domain encoder subnetwork 640 to the input layer 634 of the source-domain decoder subnetwork 630. The reconstructed source-domain data sample 664 is compared to the source-domain data sample 222 by the source-domain identity loss module 662 to generate the source-domain identity loss 666, which is used to adjust the learned parameter values of the source-domain encoder subnetwork 640 and source-domain decoder subnetwork 630.

Training of the subnetworks 620, 630, 640, 650 when the self-supervised stage is performed continues by repeating the processes above one or more times until training terminates, as described above with reference to FIG. 5. At the end of the self-supervised learning stage, the encoder subnetworks 620, 640 are trained to encode data samples as feature maps, and the decoder subnetworks 630, 650 are at least partially trained to decode feature maps and reconstruct the original data samples, in the target domain or source domain as appropriate.

In some embodiments, the subnetworks 620, 630, 640, 650 are configured similarly to the encoder subnetwork 520 and decoder subnetwork 530 of the source-domain model 314 described above with reference to FIG. 5. It will be appreciated that each of the models or networks of the domain adaptation training module 300, and in particular the target-domain model 312 described below with reference to FIGS. 7-8, may be configured or varied generally as described with reference to the source-domain model 314, except as otherwise specified.

It will be appreciated that the self-supervised learning stage (i.e. step 1008 of method 1000) implements aspects of reconstruction-based domain adaptation approaches, as described above in the Background section, as part of the hybrid learning approach disclosed herein.

After step 1008, the method 1000 proceeds to step 1010. At 1010, an adversarial learning stage is performed on the domain translation neural network 310, as described with reference to FIG. 6B.

Figure 6B:
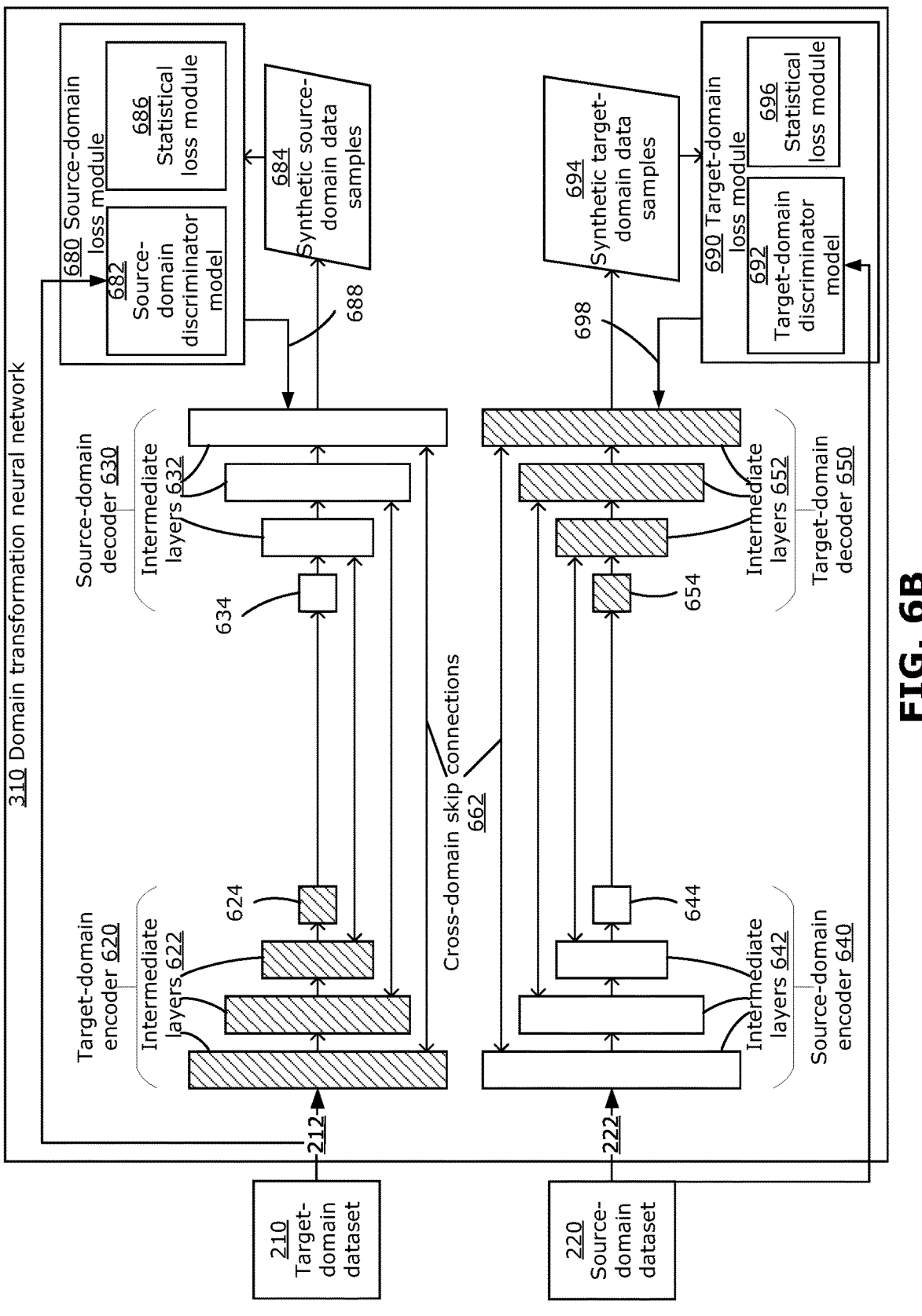
FIG. 6B is a block diagram illustrating the domain-translation neural network of FIG. 3 during an adversarial learning stage.

FIG. 6B shows the domain translation neural network 310 when an adversarial learning stage is performed to at least partially train the subnetworks 620, 630, 640, 650 to perform domain translation between the source and target domains (and, optionally, vice-versa). When the adversarial learning stage is performed at step 1010 of the method 1000, the intra-source-domain skip connections 616 and intra-target-domain skip connections 614 are disabled, and a set of one or more cross-domain skip connections 662 are enabled. The cross-domain skip connections 662 connect one or more intermediate layers of the target-domain encoder subnetwork 620 to one or more intermediate layers of the source-domain decoder subnetwork 630, and one or more intermediate layers of the source-domain encoder subnetwork 640 to one or more intermediate layers of the target-domain decoder subnetwork 650. Like the intra-source-domain skip connections 616 and intra-target-domain skip connections 614 enabled during step 1008, the cross-domain skip connections 662 are disabled in subsequent steps of the method 1000.

When the adversarial learning stage is performed at step 1010, the subnetworks 620, 630, 640, 650 of the domain-translation neural network 310 are again trained in two parallel pathways to perform two related tasks: the target-domain encoder subnetwork 620 and source-domain decoder subnetwork 630 are trained to generate synthetic source-domain data samples 684, and the source-domain encoder subnetwork 640 and target-domain decoder subnetwork 650 are trained to generate synthetic target-domain data samples 694. To train the target-domain encoder subnetwork 620 and source-domain decoder subnetwork 630, a target-domain data sample 212 is processed by the target-domain encoder subnetwork 620. The output layer 624 of the target-domain encoder subnetwork 620 provides this activation map to the input layer 634 of the source-domain decoder subnetwork 630. The source-domain decoder subnetwork 630 decodes the received activation map by processing it using its input layer 634 and its successive intermediate layers 632, with the output of the final intermediate layer 632 being provided to an image-generative output layer (not shown) configured to generate synthetic source-domain data samples 684 having the same format as source-domain data samples 222 (i.e. the source-domain decoder subnetwork 630 continues to generate images in the same format it generated during step 1008). Importantly, the synthetic source-domain data sample 684 is based on the feature map generated from the input (i.e. the target-domain data sample 212), but this feature map is decoded into an image format having the image content and format of the source domain (e.g., the same image characteristics and format as the source-domain data samples 222 used to train the source-domain encoder subnetwork 630 at step 1008). A source-domain loss module 680 generates a source-domain loss 688 based on the synthetic source-domain data sample 684 (as described below), and the source-domain loss 688 is used to adjust the learned parameter values of the target-domain encoder subnetwork 620 and source-domain decoder subnetwork 630, and this process may be repeated one or more times, in keeping with the training processes described above with reference to FIGS. 5 and 6A.

The source-domain loss module 680 includes a source-domain discriminator model 682, which is trained during step 1010 in order to act as a critic of the synthetic source-domain data samples 684, discriminating between synthetic source-domain data samples 684 that resemble source-domain data and those that do not. The source-domain discriminator model 682 is trained using the unlabeled source-domain data samples 222 from the source-domain dataset 220, concurrently or in sequence with training of the target-domain encoder subnetwork 620 and source-domain decoder subnetwork 630, in accordance with known techniques for adversarial learning, to generate an adversarial loss which can be used to train the target-domain encoder subnetwork 620 and source-domain decoder subnetwork 630. The source-domain discriminator model 682, the target-domain encoder subnetwork 620, and the source-domain decoder subnetwork 630 are thus jointly trained to operate as a generative adversarial network (GAN) to generate convincing synthetic source-domain data samples 684.

In some embodiments, the source-domain discriminator model 682 may be implemented as a multi-headed critic model having one or more intermediate layers, an output layer, and multiple output heads. In some embodiments, a first output head is configured to process an output of the output layer to generate a first head loss, and a second output head is configured to process an output of one of the intermediate layers to generate a second head loss. In some embodiments, the first head loss is encoded at a first image resolution: e.g., the first head loss is encoded as an image map at a relatively low resolution, consisting of a 2D matrix encoding a relatively small number of adversarial loss values, each adversarial loss value reflecting a judgment by the critic model of the authenticity of a relatively large pixel region of the synthetic source-domain data sample 684. The second head loss is encoded at a second image resolution: e.g., the second head loss is encoded as an image map at a relatively higher resolution, consisting of a 2D matrix encoding a relatively large number of adversarial loss values, each adversarial loss value reflecting a judgment by the critic model of the authenticity of a relatively small pixel region (or a single pixel) of the synthetic source-domain data sample 684. The multi-headed critic model may then generate an adversarial loss based on the first head loss and the second head loss, for example by summing or concatenating the first head loss and the second head loss. In some embodiments, the two resolution levels used by the multi-headed critic model may correspond to two of the resolution levels reflected in the cross-domain skip connection 662.

In some embodiments, the source-domain loss module 680 also includes a statistical loss module 686 configured to generate a statistical loss based on mean and covariance information between the synthetic source-domain data sample 684 and the source-domain dataset 220 as a whole. Prior to or as part of the method 1000, the statistical loss module 686 may be configured. Covariance matrices $\Sigma_s$, $\Sigma_t$ of the source-domain dataset 220 and target-domain dataset 210, respectively, are computed. Mean image matrices $\mu_s$, $\mu_t$ of the source-domain dataset 220 and target-domain dataset 210, respectively, are computed. The covariance matrices and mean image matrices may be stored in the memory 208 and used by the statistical loss module 686 during step 1010 to generate a statistical loss. The statistical loss module 686 computes the statistical loss by comparing mean information of the synthetic source-domain data sample 684 (e.g., the mean image matrix of the synthetic source-domain data sample 684) and the previously-stored mean information of the source-domain dataset 220 (e.g., the mean image matrix $\mu_s$ of the source-domain dataset 220), and comparing covariance information of the synthetic source-domain data sample 684 (e.g., the covariance matrix of the synthetic source-domain data sample 684) and the previously-stored covariance information of the source-domain dataset 220 (e.g., the covariance matrix $\Sigma_s$ of the source-domain dataset 220). In some embodiments, the mean information and covariance information of the synthetic source-domain data sample 684 may be computed based on a batch of source-domain data samples 222 before bring compared to the mean information and covariance information of the source-domain dataset 220. It will be appreciated that example embodiments therefore combine a mean discrepancy approach, similar to MMD, with a covariance alignment approach, similar to CORAL, as described in the MMD and CORAL references cited above, as part of the hybrid learning approach disclosed herein. In addition to combining the mean-based and covariance-based approaches of MMD and CORAL, example embodiments described herein also differ from existing discrepancy-based approaches by pre-computing and storing the mean information and covariance information of the entire source-domain dataset 220 for use in comparison instead of comparing these statistics between two relatively small batches of data samples, which may yield improved training performance, such as improved prediction accuracy of the trained target-domain model 312 and/or reduced time or other resources required to train the target-domain model 312.

The source-domain loss module 680 may use the adversarial loss generated by the source-domain discriminator model 682 (e.g., the multi-headed critic model) in combination with the statistical loss generated by the statistical loss module 686, to generate a source-domain loss 688 that is used to adjust the learned parameter values of the target-domain encoder subnetwork 620 and source-domain decoder subnetwork 630, using techniques such as back propagation and gradient descent. As described above with reference to the source-domain model 314 of FIG. 5, this process may be repeated one or more times to train the target-domain encoder subnetwork 620 and target-domain decoder subnetwork 650.

To train the source-domain encoder subnetwork 640 and target-domain decoder subnetwork 650, the same process is followed as described above with reference to the target-domain encoder subnetwork 620 and source-domain decoder subnetwork 630, with source-domain and target-domain components swapped as appropriate: for example, the target-domain discriminator model 692, trained using unlabeled target-domain data samples 212, acts as a critic of the synthetic target-domain data samples 694, and the target-domain loss module 690 generates a target-domain loss 698 used to adjust the learned parameter values. The statistical loss module 696 uses the covariance matrix $\Sigma_t$ and the mean image matrix $\mu_t$ of the target-domain dataset 210.

It will be appreciated that the described examples may therefore use aspects of adversarial approaches to domain adaptation as part of the hybrid learning approach disclosed herein.

It will also be appreciated that training the target-domain encoder subnetwork 620 and source-domain decoder subnetwork 630 is not strictly necessary for the subsequent steps of the method 1000, and step 1010 may instead be limited to training of the source-domain encoder subnetwork 640 and target-domain decoder subnetwork 650. However, there may be other uses for a target-domain encoder subnetwork 620 and source-domain decoder subnetwork 630 that are trained together to translate data samples from the target domain to the source domain, so some embodiments may train this pair of subnetworks 620, 630 as well as the essential pair 640, 650 used in subsequent steps of the method 1000.

After step 1010, the method 1000 proceeds to step 1012. At 1012, a self-supervised learning stage is performed to at least partially train an encoder subnetwork of the target-domain model 312, in combination with an auxiliary decoder subnetwork 706, to reconstruct target-domain data samples 212. The self-supervised learning stage performed at step 1012 is shown in FIG. 7.

Figure 7:
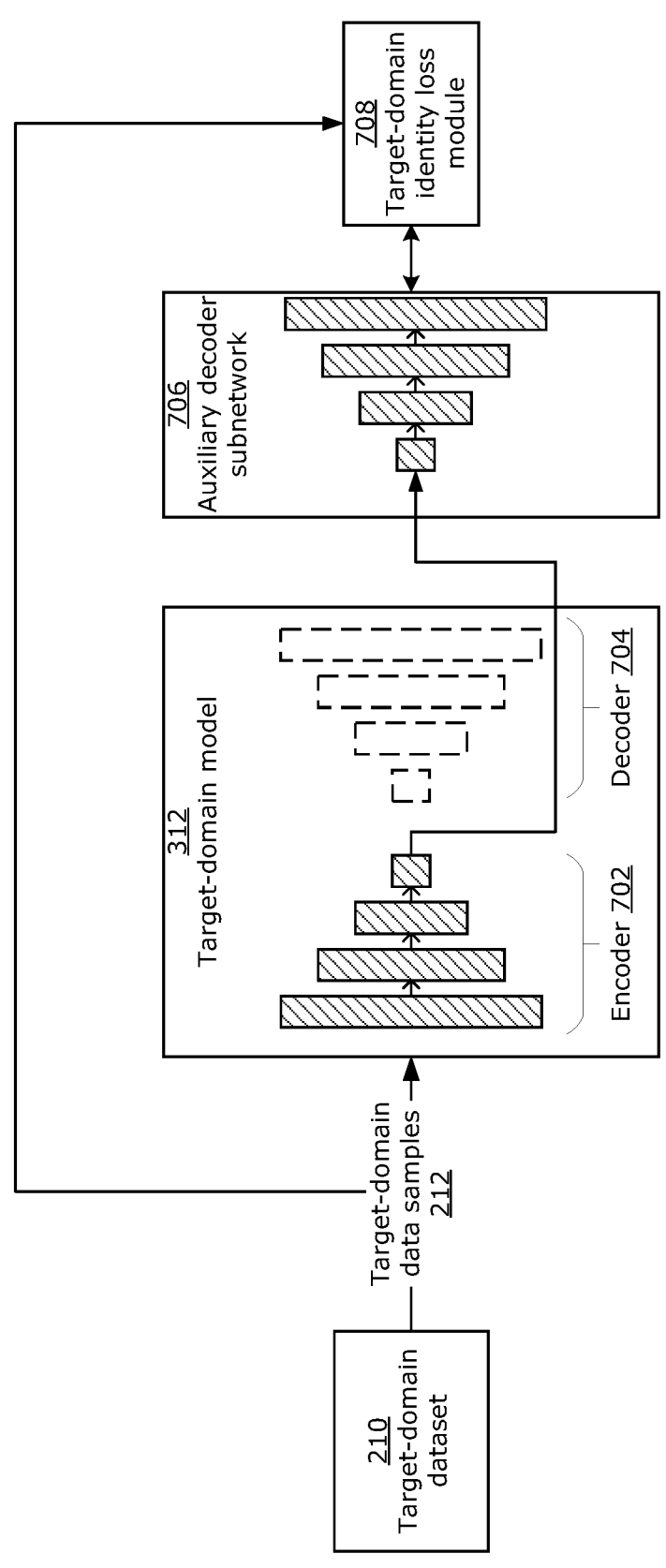
FIG. 7 is a block diagram illustrating an encoder subnetwork of the target-domain model of FIG. 3 and an auxiliary decoder subnetwork during a self-supervised learning stage.

FIG. 7 shows an encoder subnetwork 702 of the target-domain model 312, in combination with an auxiliary decoder subnetwork 706, being at least partially trained to reconstruct target-domain data samples 212 when a self-supervised learning stage is performed at step 1012. The target-domain dataset 210 is sparsely labeled, and therefore contains a large number of unlabeled target-domain data samples 212. These may be leveraged to train the encoder subnetwork 702 of the target-domain model 312 to encode target-domain data samples 212 as feature maps as part of a data sample reconstruction training process.

During the self-supervised learning stage of step 1012, the encoder subnetwork 702 processes target-domain data samples 212 to generate activation maps, which are provided to the auxiliary decoder network 706 as input. The auxiliary decoder network 706 may be configured similarly to the target-domain decoder subnetwork 650 of the domain translation neural network 310: it is configured to generate a synthetic target-domain data sample by decoding the activation map received as input. As during the self-supervised learning stage of step 1008, in which the target-domain encoder subnetwork 620 and target-domain decoder subnetwork 650 were trained to reconstruct target-domain data samples 212, the encoder subnetwork 702 of the target-domain model 312 and the auxiliary decoder network 706 are now (during step 1012) trained to perform the same reconstruction task, using a target-domain identity loss module 708 that may be similar to the target-domain identity loss module 664 used during step 108.

By the end of the self-supervised learning stage performed at step 1012, the encoder subnetwork 702 of the target-domain model 312 will be at least partially trained to encode features of target-domain data samples 212 as activation maps.

After step 1012, the method 1000 proceeds to step 1014. At 1014, a semi-supervised learning stage is performed to continue training the encoder subnetwork 702 of the target-domain model 312 to encode target-domain data samples 212 and to at least partially train the decoder subnetwork 704 of the target-domain model 312 to perform the prediction task on the feature maps generated by the encoder subnetwork 702, using the small number of labeled target-domain data samples 212. The semi-supervised learning stage performed at step 1014 is shown in FIG. 8.

Figure 8:
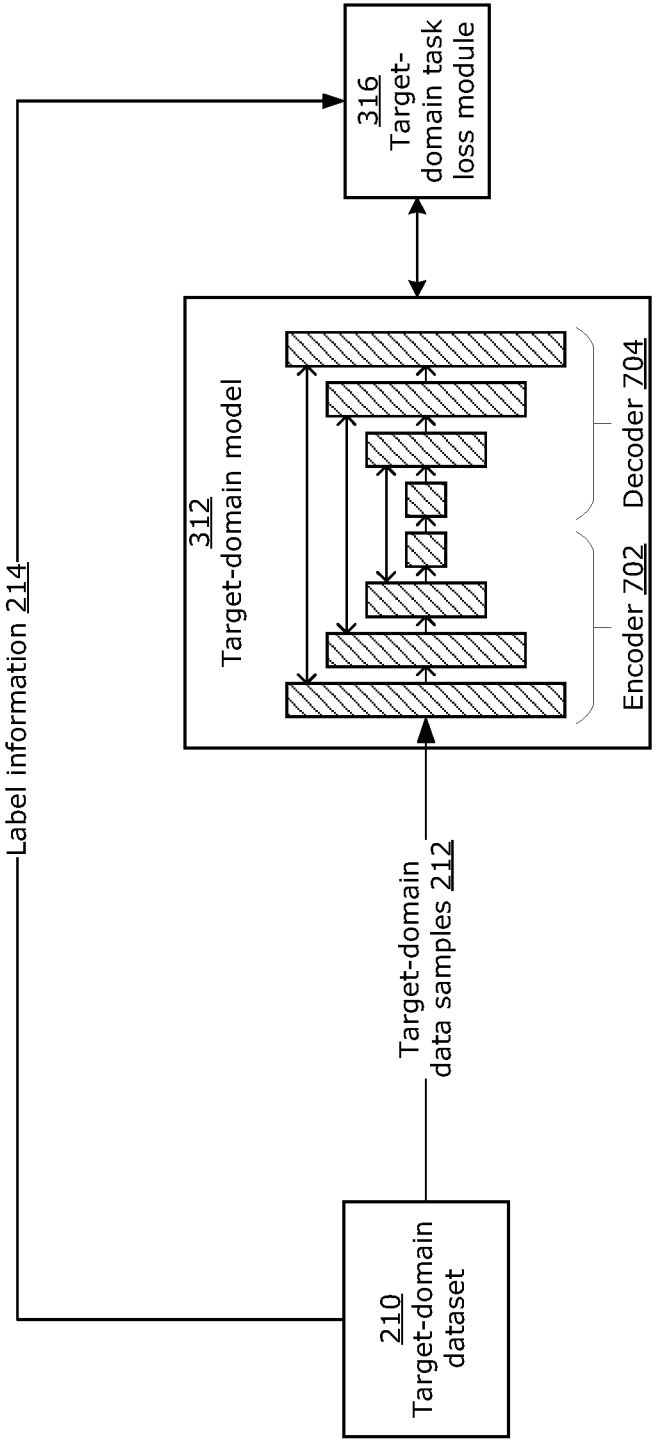
FIG. 8 is a block diagram illustrating the domain-translation neural network, target-domain model, and source-domain model of FIG. 3 during a semi-supervised learning stage.

FIG. 8 shows the training of the target-domain model 312 to perform the prediction task on target-domain data samples 212 using semi-supervised learning (i.e. the semi-supervised learning stage performed at step 1014). One or more skip connections may be enabled between one or more intermediate layers of the encoder subnetwork 702 and the decoder subnetwork 704 of the target-domain model 312. The encoder subnetwork 702 receives labeled target-domain data samples 212 (i.e., those few target-domain data samples 212 stored in the target-domain dataset 210 in association with label information 214) and encodes them as activation maps, which are provided to the decoder subnetwork 704. The decoder subnetwork 704 generates prediction information based on the received activation maps, such as image maps indicating predicted categories for each pixel of the input data sample. A target-domain task loss module 316 compares the prediction information generated by the target-domain model 312 to the corresponding label information 214 of the processed target-domain data samples 212, and generates a task loss based on the comparison. The task loss is used to adjust the learned parameters of the encoder subnetwork 702 and the decoder subnetwork 704 of the target-domain model 312, using techniques such as back propagation and gradient descent. As described above with reference to the source-domain model 314 of FIG. 5, this process may be repeated one or more times to train the target-domain model 312.

After step 1014, the method 1000 proceeds to step 1016. At 1016, the source-domain encoder subnetwork 640 and target-domain decoder subnetwork 650 of the domain translation neural network 310 are used to generate synthetic target-domain data samples 694 based on source-domain data samples 222 used as input. In some embodiments, the synthetic target-domain data samples 694 generated at step 1016 may include one or more synthetic target-domain data samples 694 previously generated during the self-supervised learning stage of step 1008. The synthetic target-domain data samples 694 may be stored in the memory 208 for use during the final training step of method 1000, step 1018.

At 1018, the target-domain model 312 is trained to perform the prediction task on synthetic target-domain data samples 694.

Figure 9:
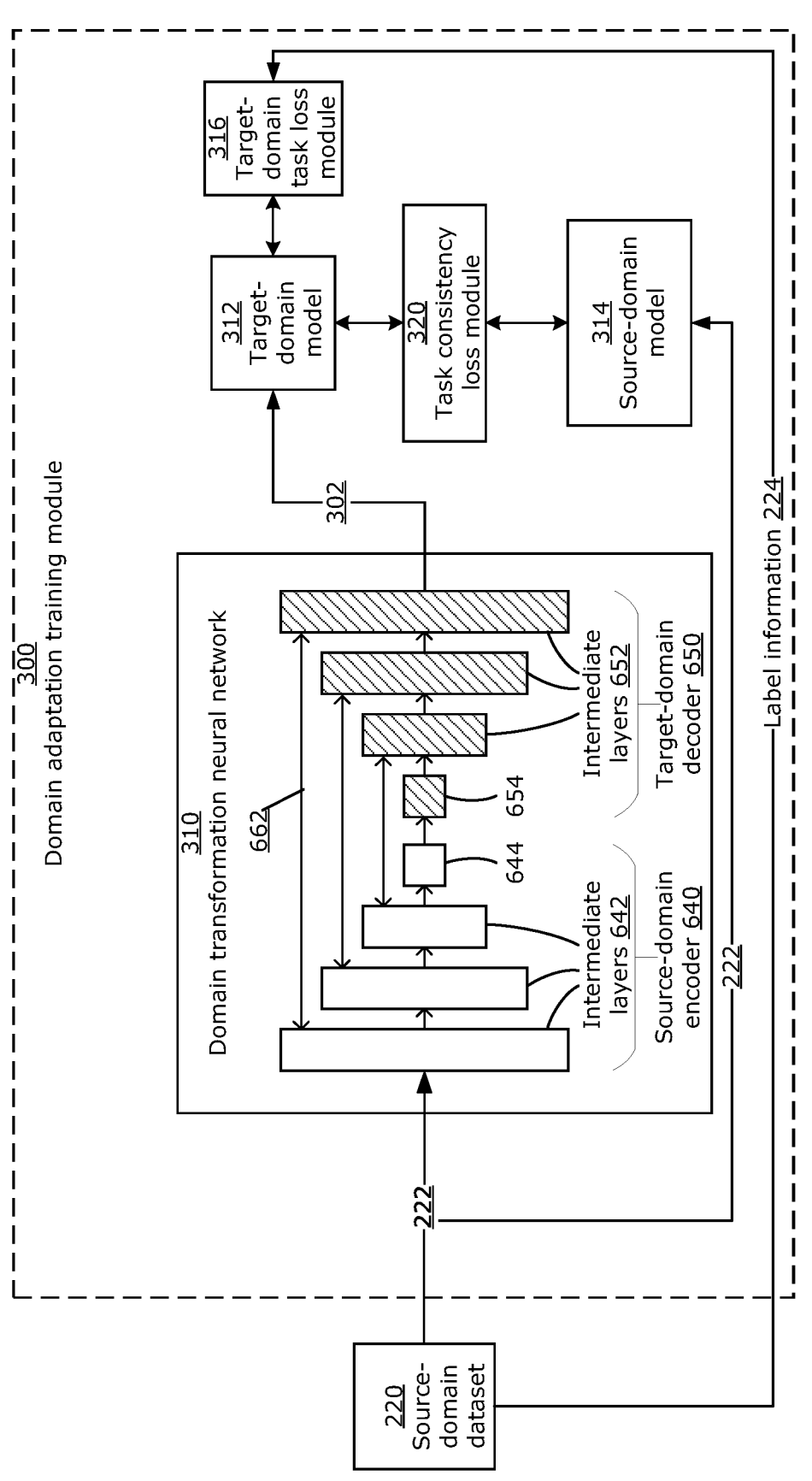
FIG. 9 is a block diagram illustrating the source-domain model of FIG. 3 during an unsupervised learning stage.

FIG. 9 shows the training of the target-domain model 312 to perform the prediction task on the synthetic target-domain data samples 694 generated during step 1016 (and/or step 1008) at step 1018. During the unsupervised learning stage of step 1018, the target-domain encoder subnetwork 620 and source-domain decoder subnetwork 630 of the domain translation neural network 310 may also be further trained to generate synthetic target-domain data samples 694 based on source-domain data samples 222 used as input.

During the unsupervised learning stage of step 1018, synthetic target-domain data samples 694 generated during step 1016 and/or step 1008 may be provided as input to the target-domain model 312. In some embodiments, the target-domain encoder subnetwork 620 and source-domain decoder subnetwork 630 of the domain translation neural network 310 may also be used during step 1018 to generate further synthetic target-domain data samples 694. The target-domain model 312 processes the synthetic target-domain data samples 694 to generate target-domain model prediction information.

Also during the unsupervised learning stage of step 1018, the same source-domain data samples 222 used by the target-domain encoder subnetwork 620 and source-domain decoder subnetwork 630 of the domain translation neural network 310 to generate the synthetic target-domain data samples 694 are provided to the trained source-domain model 314, which performs the prediction task on these source-domain data samples 222 to generate source-domain model prediction information.

The target domain task loss module 316, previously used during training of the target-domain model 312 during step 1014, is again used to generate a task loss based on a comparison of the target-domain model prediction information and the label information 224 of the source-domain data samples 222 corresponding to the synthetic target-domain data samples 694. A task consistency loss module 320 generates a task consistency loss based on a comparison between the target-domain model prediction information and the source-domain model prediction information based on each synthetic target-domain data samples 694 and its corresponding source-domain data sample 222. The task loss and the task consistency loss may be combined or used jointly to adjust the learned parameters of the target-domain model 312, as well as the target-domain encoder subnetwork 620 and source-domain decoder subnetwork 630 of the domain translation neural network 310, using techniques such as back propagation and gradient descent. As described above with reference to the FIGS. 5-8, this process may be repeated one or more times to train the target-domain model 312, as well as the target-domain encoder subnetwork 620 and source-domain decoder subnetwork 630 of the domain translation neural network 310.

Steps 1006 through 1018 of method 1000 may be repeated one or more times, each iteration of these steps constituting a training epoch for training of the target-domain model 312. After a final training epoch completes (e.g., based on training termination conditions as described above), the trained domain transformation neural network 310 can be deployed and used to translate unseen frames from the source domain into fake target domain frames (and optionally from the target domain to the source domain, as described above), and the target-domain model 312 is a trained model for performing the prediction task (e.g., semantic segmentation) on previously-unseen target-domain data samples (e.g., point cloud frames or images).

Example embodiments described herein may provide an end-to-end training process, which can be run once in order to fully train the domain transformation neural network 310 and the target-domain model 312. In contrast, many existing approaches (such as Cycada) require multiple iterations of executing software, saving pieces of generated code, and executing the saved code.

Based on testing data, example embodiments described herein in the context of semantic segmentation using point cloud data may provide a trained target-domain model 312 that generalizes reasonably well when trained with a small set of labeled target-domain point cloud frames (e.g., ~1000 labeled nuScenes point cloud frames) and evaluated with a target-domain validation set of labeled point cloud frames (e.g., labeled nuScenes point cloud frames). The accuracy of the trained target-domain model 312, measured as mean Intersection over Union (mIoU), is reasonably close (~30%) to that of a model trained using a fully-labeled target-domain dataset (e.g. a target-domain model 312 trained using a fully-labeled nuScenes dataset), thereby outperforming existing domain adaptation approaches.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for training a target-domain model, comprising:

obtaining a target-domain dataset comprising a plurality of target-domain data samples;

obtaining a source-domain dataset comprising a plurality of source-domain data samples, each source-domain data sample being associated with respective label information;

performing self-supervised learning to train a domain translation neural network, comprising a target-domain encoder subnetwork, a target-domain decoder subnetwork, a source-domain encoder subnetwork, and a source-domain decoder subnetwork, by:

training the target-domain encoder subnetwork to encode target-domain data, and training the target-domain decoder subnetwork to reconstruct target-domain data samples from encoded target-domain data, using one or more target-domain data samples of the target-domain dataset; and training the source-domain encoder subnetwork to encode source-domain data, and training the source-domain decoder subnetwork to reconstruct source-domain data samples from encoded source-domain data, using one or more source-domain data samples of the source-domain dataset;

performing adversarial learning to train the domain translation neural network by:

training the target-domain encoder subnetwork to encode target-domain data, and training the source-domain decoder subnetwork to synthesize source-domain data samples from encoded target-domain data, using one or more target-domain data samples of the target-domain dataset; and training the source-domain encoder subnetwork to encode source-domain data, and training the target-domain decoder subnetwork to synthesize target-domain data samples from encoded source-domain data, using one or more source-domain data samples of the source-domain dataset;

processing one or more source-domain data samples of the plurality of source-domain data samples, using the source-domain encoder subnetwork and the target-domain decoder subnetwork, to generate a respective one or more synthetic target domain data samples; and training the target-domain model to perform a prediction task on target domain data using:

the one or more synthetic target-domain data samples; and the respective label information of the one or more source-domain target samples.

2. The method of claim 1, wherein:

performing self-supervised learning to train the domain translation neural network comprises:

enabling one or more intra-target-domain skip connections between one or more intermediate layers of the target-domain encoder subnetwork and one or more intermediate layers of the target-domain decoder subnetwork;

repeating one or more times:

processing a source-domain data sample of the source-domain dataset using the target-domain encoder subnetwork and the target-domain decoder subnetwork to generate a reconstructed target-domain data sample;

generating a target data identity loss based on a comparison of the target-domain data sample and the reconstructed target-domain data sample; and adjusting a plurality of learned parameters of the target-domain encoder subnetwork and the target-domain decoder subnetwork based on the target data identity loss;

enabling one or more intra-source-domain skip connections between one or more intermediate layers of the source-domain encoder subnetwork and one or more intermediate layers of the source-domain decoder subnetwork; and repeating one or more times:

processing a source-domain data sample of the target-domain dataset using the target-domain encoder subnetwork and the source-domain decoder subnetwork to generate a reconstructed source-domain data sample;

generating a source data identity loss based on a comparison of the source-domain data sample and the reconstructed source-domain data sample; and adjusting a plurality of learned parameters of the source-domain encoder subnetwork and the source-domain decoder subnetwork based on the source data identity loss; and performing adversarial learning to train the domain translation neural network comprises:

training a target-domain discriminator model to identify target-domain data samples using one or more target-domain data samples of the target-domain dataset;

disabling the intra-source-domain skip connections;

enabling one or more cross-domain skip connections between one or more intermediate layers of the source-domain encoder subnetwork and one or more intermediate layers of the target-domain decoder subnetwork; and repeating one or more times:

processing a source-domain data sample of the source-domain dataset using the source-domain encoder subnetwork and the target-domain decoder subnetwork to generate a synthetic target-domain data sample;

generating an adversarial loss, using the target-domain discriminator model, based on the synthetic target-domain data sample; and adjusting a plurality of learned parameters of the source-domain encoder subnetwork and the target-domain decoder subnetwork based on the adversarial loss.

3. The method of claim 2, further comprising:

computing mean information and covariance information of the target-domain dataset; and after each repetition of processing a source-domain data sample of the source-domain dataset using the source-domain encoder subnetwork and the target-domain decoder subnetwork to generate a synthetic target-domain data sample:

generating a statistical loss based on a comparison between:

mean information of the synthetic target-domain data sample and the mean information of the target-domain dataset; and covariance information of the synthetic target-domain data sample and the covariance information of the target-domain dataset; and wherein the plurality of learned parameters of the source-domain encoder subnetwork and the target-domain decoder subnetwork are adjusted based on the adversarial loss and the statistical loss.

4. The method of claim 2, further comprising obtaining a source-domain model trained to perform the prediction task on source-domain data;

wherein training the target-domain model to perform the prediction task on target domain data comprises performing unsupervised learning to train the target-domain model by:

repeating one or more times:

selecting a selected source-domain data sample from the source-domain dataset;

processing the selected source-domain data sample, using the source-domain model, to generate source-domain model prediction information;

processing the selected source-domain data sample, using the source-domain encoder subnetwork of the domain translation neural network, to generate a synthetic target-domain data sample;

processing the synthetic target-domain data sample, using the target-domain model, to generate target-domain model prediction information;

generating a task consistency loss based on a comparison of the source-domain model prediction information and the target-domain model prediction information;

generating a task loss based on a comparison of the target-domain model prediction information and the label information of the selected source-domain data sample; and adjusting a plurality of learned parameters of the target-domain model, the source-domain encoder subnetwork, and the target-domain decoder subnetwork based on the task consistency loss and the task loss.

5. The method of claim 4, wherein:

each of one or more target-domain data samples of the target-domain dataset is associated with respective label information; and training the target-domain model to perform the prediction task on target domain data further comprises, prior to performing unsupervised learning stage to train the target-domain model, performing semi-supervised learning to train the target-domain model by repeating one or more times:

selecting a selected target-domain data sample associated with respective label information from the target-domain dataset;

processing the selected target-domain data sample, using the target-domain model, to generate target-domain model prediction information;

generating a task loss based on a comparison of the target-domain model prediction information and the label information of the selected target-domain data sample; and adjusting a plurality of learned parameters of the target-domain model based on the task loss.

6. The method of claim 5, wherein:

the target-domain model comprises an encoder subnetwork and a decoder subnetwork;

training the target-domain model to perform the prediction task on target domain data further comprises, prior to performing semi-supervised learning to train the target-domain model, performing self-supervised learning to train the target-domain model by:

providing an auxiliary decoder subnetwork; and repeating one or more times:

selecting a selected target-domain data sample from the target-domain dataset;

processing the selected target-domain data sample, using the encoder subnetwork and the auxiliary decoder subnetwork, to generate a reconstructed selected target-domain data sample;

generating an identity loss based on a comparison of the reconstructed selected target-domain data sample and the selected target-domain data sample; and adjusting a plurality of learned parameters of the encoder subnetwork and the auxiliary decoder subnetwork based on the identity loss.

7. The method of claim 4, wherein obtaining the source-domain model comprises training the source-domain model, using supervised learning, to perform the prediction task on source-domain data by:

repeating one or more times:

selecting a selected source-domain data sample from the target-domain dataset;

processing the selected source-domain data sample, using the source-domain model, to generate source-domain model prediction information;

generating a task loss based on a comparison of the source-domain model prediction information and the respective label information of the selected source-domain data sample; and adjusting a plurality of learned parameters of the source-domain model based on the task loss.

8. The method of claim 2, wherein:

the plurality of target-domain data samples comprises a plurality of imaging data samples obtained in a first context, each imaging data sample comprising a two-dimensional matrix of data points, each data point having one or more channels;

the plurality of source-domain data samples comprises a plurality of imaging data samples obtained in a second context, each imaging data sample comprising a two-dimensional matrix of data points, each data point having one or more channels; and the prediction task is a data point classification task for classifying data points of an imaging data sample.

9. The method of claim 8, wherein:

the plurality of imaging data samples obtained in the first context comprise a plurality of LIDAR point cloud frames obtained in the first context;

the plurality of imaging data samples obtained in the second context comprise a plurality of LIDAR point cloud frames obtained in the second context;

the data points of the imaging data samples are points of the point clouds; and the prediction task is a semantic segmentation task for classifying each point of a point cloud frame into one of a plurality of classes.

10. The method of claim 9, wherein:

obtaining the target-domain dataset comprises preprocessing a plurality of raw target-domain data samples to generate the plurality of target-domain data samples;

obtaining the source-domain dataset comprises prepro-
cessing a plurality of raw source-domain data samples
to generate the plurality of source-domain data
samples; and preprocessing a data sample comprises performing
spherical projection normalization on the data sample.

11. A system for training a target-domain model, the
system comprising:

a processor device; and a memory storing:

a target-domain dataset comprising a plurality of target-
domain data samples;

a source-domain dataset comprising a plurality of source-
domain data samples, each source-domain data sample
being associated with respective label information; and machine-executable instructions which, when executed
by the processor device, cause the system to:

perform self-supervised learning to train a domain
translation neural network, comprising a target-do-
main encoder subnetwork, a target-domain decoder
subnetwork, a source-domain encoder subnetwork,
and a source-domain decoder subnetwork, by:

training the target-domain encoder subnetwork to
encode target-domain data, and training the target-
domain decoder subnetwork to reconstruct target-
domain data samples from encoded target-domain
data, using one or more target-domain data
samples of the target-domain dataset; and training the source-domain encoder subnetwork to
encode source-domain data, and training the
source-domain decoder subnetwork to reconstruct
source-domain data samples from encoded
source-domain data, using one or more source-
domain data samples of the source-domain data-
set;

perform adversarial learning to train the domain trans-
lation neural network by:

training the target-domain encoder subnetwork to
encode target-domain data, and training the
source-domain decoder subnetwork to synthesize
source-domain data samples from encoded target-
domain data, using one or more target-domain
data samples of the target-domain dataset; and training the source-domain encoder subnetwork to
encode source-domain data, and training the tar-
get-domain decoder subnetwork to synthesize tar-
get-domain data samples from encoded source-
domain data, using one or more source-domain
data samples of the source-domain dataset;

process one or more source-domain data samples of the
plurality of source-domain data samples, using the
source-domain encoder subnetwork and the target-
domain decoder subnetwork, to generate a respective
one or more synthetic target domain data samples;
and train the target-domain model to perform a prediction
task on target domain data using:

the one or more synthetic target-domain data
samples; and the respective label information of the one or more
source-domain target samples.

12. The system of claim 11, wherein:

performing self-supervised learning to train the domain
translation neural network comprises:

enabling one or more intra-target-domain skip connec-
tions between one or more intermediate layers of the target-domain encoder subnetwork and one or more
intermediate layers of the target-domain decoder
subnetwork;

repeating one or more times:

processing a source-domain data sample of the
source-domain dataset using the target-domain
encoder subnetwork and the target-domain
decoder subnetwork to generate a reconstructed
target-domain data sample;

generating a target data identity loss based on a
comparison of the target-domain data sample and
the reconstructed target-domain data sample; and adjusting a plurality of learned parameters of the
target-domain encoder subnetwork and the target-
domain decoder subnetwork based on the target
data identity loss;

enabling one or more intra-source-domain skip con-
nections between one or more intermediate layers of
the source-domain encoder subnetwork and one or
more intermediate layers of the source-domain
decoder subnetwork; and repeating one or more times:

processing a source-domain data sample of the tar-
get-domain dataset using the target-domain
encoder subnetwork and the source-domain
decoder subnetwork to generate a reconstructed
source-domain data sample;

generating a source data identity loss based on a
comparison of the source-domain data sample and
the reconstructed source-domain data sample; and adjusting a plurality of learned parameters of the
source-domain encoder subnetwork and the
source-domain decoder subnetwork based on the
source data identity loss; and performing adversarial learning to train the domain trans-
lation neural network comprises:

training a target-domain discriminator model to iden-
tify target-domain data samples using one or more
target-domain data samples of the target-domain
dataset;

disabling the intra-source-domain skip connections;

enabling one or more cross-domain skip connections
between one or more intermediate layers of the
source-domain encoder subnetwork and one or more
intermediate layers of the target-domain decoder
subnetwork; and repeating one or more times:

processing a source-domain data sample of the
source-domain dataset using the source-domain
encoder subnetwork and the target-domain
decoder subnetwork to generate a synthetic target-
domain data sample;

generating an adversarial loss, using the target-domain
discriminator model, based on the synthetic target-
domain data sample; and adjusting a plurality of learned parameters of the
source-domain encoder subnetwork and the target-
domain decoder subnetwork based on the adversarial
loss.

13. The system of claim 12, wherein the machine-execut-
able instructions, when executed by the processor device,
further cause the system to:

compute mean information and covariance information of
the target-domain dataset; and after each repetition of processing a source-domain data
sample of the source-domain dataset using the source-domain encoder subnetwork and the target-domain decoder subnetwork to generate a synthetic target-domain data sample:

generate a statistical loss based on a comparison between:

mean information of the synthetic target-domain data sample and the mean information of the target-domain dataset; and covariance information of the synthetic target-domain data sample and the covariance information of the target-domain dataset; and wherein the plurality of learned parameters of the source-domain encoder subnetwork and the target-domain decoder subnetwork are adjusted based on the adversarial loss and the statistical loss.

14. The system of claim 12, wherein:

the machine-executable instructions, when executed by the processor device, further cause the system to obtain a source-domain model trained to perform the prediction task on source-domain data; and training the target-domain model to perform the prediction task on target domain data comprises performing unsupervised learning to train the target-domain model by:

repeating one or more times:

selecting a selected source-domain data sample from the source-domain dataset;

processing the selected source-domain data sample, using the source-domain model, to generate source-domain model prediction information;

processing the selected source-domain data sample, using the source-domain encoder subnetwork of the domain translation neural network, to generate a synthetic target-domain data sample;

processing the synthetic target-domain data sample, using the target-domain model, to generate target-domain model prediction information;

generating a task consistency loss based on a comparison of the source-domain model prediction information and the target-domain model prediction information;

generating a task loss based on a comparison of the target-domain model prediction information and the label information of the selected source-domain data sample; and adjusting a plurality of learned parameters of the target-domain model, the source-domain encoder subnetwork, and the target-domain decoder subnetwork based on the task consistency loss and the task loss.

15. The system of claim 14, wherein:

each of one or more target-domain data samples of the target-domain dataset is associated with respective label information; and training the target-domain model to perform the prediction task on target domain data further comprises, prior to performing unsupervised learning stage to train the target-domain model, performing semi-supervised learning to train the target-domain model by repeating one or more times:

selecting a selected target-domain data sample associated with respective label information from the target-domain dataset;

processing the selected target-domain data sample, using the target-domain model, to generate target-domain model prediction information;

generating a task loss based on a comparison of the target-domain model prediction information and the label information of the selected target-domain data sample; and adjusting a plurality of learned parameters of the target-domain model based on the task loss.

16. The system of claim 15, wherein:

the target-domain model comprises an encoder subnetwork and a decoder subnetwork;

training the target-domain model to perform the prediction task on target domain data further comprises, prior to performing semi-supervised learning to train the target-domain model, performing self-supervised learning to train the target-domain model by:

providing an auxiliary decoder subnetwork; and repeating one or more times:

selecting a selected target-domain data sample from the target-domain dataset;

processing the selected target-domain data sample, using the encoder subnetwork and the auxiliary decoder subnetwork, to generate a reconstructed selected target-domain data sample;

generating an identity loss based on a comparison of the reconstructed selected target-domain data sample and the selected target-domain data sample; and adjusting a plurality of learned parameters of the encoder subnetwork and the auxiliary decoder subnetwork based on the identity loss.

17. The system of claim 12, wherein:

the plurality of target-domain data samples comprises a plurality of LIDAR point cloud frames obtained in a first context;

the plurality of source-domain data samples comprises a plurality of LIDAR point cloud frames obtained in a second context; and the prediction task is a semantic segmentation task for classifying each point of a point cloud frame into one of a plurality of classes.

18. A non-transitory processor-readable medium having machine-executable instructions stored thereon which, when executed by a processor of a device, cause the device to:

obtain a target-domain dataset comprising a plurality of target-domain data samples;

obtain a source-domain dataset comprising a plurality of source-domain data samples, each source-domain data sample being associated with respective label information;

perform self-supervised learning to train a domain translation neural network, comprising a target-domain encoder subnetwork, a target-domain decoder subnetwork, a source-domain encoder subnetwork, and a source-domain decoder subnetwork, by:

training the target-domain encoder subnetwork to encode target-domain data, and training the target-domain decoder subnetwork to reconstruct target-domain data samples from encoded target-domain data, using one or more target-domain data samples of the target-domain dataset; and training the source-domain encoder subnetwork to encode source-domain data, and training the source-domain decoder subnetwork to reconstruct source-domain data samples from encoded source-domain data, using one or more source-domain data samples of the source-domain dataset;

perform adversarial learning to train the domain translation neural network by:

training the target-domain encoder subnetwork to encode target-domain data, and training the source-domain decoder subnetwork to synthesize source-domain data samples from encoded target-domain data, using one or more target-domain data samples of the target-domain dataset; and training the source-domain encoder subnetwork to encode source-domain data, and training the target-domain decoder subnetwork to synthesize target-domain data samples from encoded source-domain data, using one or more source-domain data samples of the source-domain dataset;

process one or more source-domain data samples of the plurality of source-domain data samples, using the source-domain encoder subnetwork and the target-domain decoder subnetwork, to generate a respective one or more synthetic target domain data samples; and train a target-domain model to perform a prediction task on target domain data using:

the one or more synthetic target-domain data samples; and the respective label information of the one or more source-domain target samples.

\* \* \* \* \*